(12) United States Patent
Kojima et al.

(10) Patent No.: US 6,440,506 B1
(45) Date of Patent: *Aug. 27, 2002

(54) SUPERTWISTED NEMATIC LIQUID CRYSTAL DISPLAYS

(75) Inventors: Akihiro Kojima, Atsugi; Fumio Shimano, Miura; Yukiko Fujii, Sagamihara; Izumi Saito, Yokohama; Kazuo Totani, Naka-gun, all of (JP)

(73) Assignee: Merck Patent Gesellschaft mit beschrankter Haftung (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/443,433

(22) Filed: Nov. 19, 1999

(30) Foreign Application Priority Data

Nov. 19, 1998 (EP) ............................................... 98121578

(51) Int. Cl.[7] ........................ C09K 19/02; C09K 19/34; C09K 19/30; C09K 19/12
(52) U.S. Cl. ............... 428/1.1; 252/299.61; 252/299.63; 252/299.66; 252/299.67; 349/179; 349/186
(58) Field of Search ........................ 252/299.63, 299.66, 252/299.61, 299.67; 428/1.1; 349/186, 179

(56) References Cited

U.S. PATENT DOCUMENTS

| | | | | |
|---|---|---|---|---|
| 5,653,912 A | * | 8/1997 | Nakagawa et al. | 252/299.01 |
| 5,714,087 A | * | 2/1998 | Pausch et al. | 252/299.01 |
| 5,855,814 A | * | 1/1999 | Matsui et al. | 252/299.67 |
| 5,874,022 A | * | 2/1999 | Kubo et al. | 252/299.01 |
| 5,932,138 A | * | 8/1999 | Plach et al. | 252/299.66 |
| 5,948,318 A | * | 9/1999 | Miyazawa et al. | 252/299.63 |
| 5,976,407 A | * | 11/1999 | Tarumi et al. | 252/299.01 |
| 5,993,692 A | * | 11/1999 | Tarumi et al. | 252/299.63 |
| 5,997,767 A | * | 12/1999 | Hirschmann et al. | 252/299.63 |
| 6,028,655 A | * | 2/2000 | Weber et al. | 349/182 |
| 6,036,884 A | * | 3/2000 | Tarumi et al. | 252/299.63 |
| 6,054,193 A | * | 4/2000 | Hirschmann et al. | 428/1 |
| 6,056,894 A | * | 5/2000 | Hirschmann et al. | 252/299.63 |

* cited by examiner

Primary Examiner—Shean C. Wu
(74) Attorney, Agent, or Firm—Millen, White, Zelano & Branigan, P.C.

(57) ABSTRACT

The invention relates to supertwist liquid-crystal displays (STN-LCDs) having short switching times and good steepnesses and angle dependencies, and to the novel nematic liquid-crystal mixtures used therein, which comprise compounds having a 3,4,5-trifluorophenyl group together with compounds of formula I

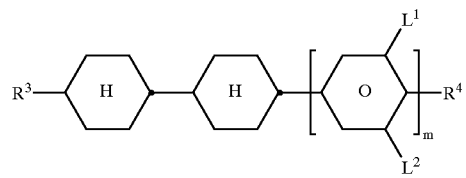

wherein $R^3$ is an alkenyl group with 2 to 7 C atoms, $R^4$ is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, or, in case m=1, $R^4$ can also be Q—Y, Q is $CF_2$, $OCF_2$, CFH, OCFH or a single bond, Y is F or Cl, $L^1$ and $L^2$ are each independently H or F, and m is 0 or 1.

41 Claims, No Drawings

SUPERTWISTED NEMATIC LIQUID CRYSTAL DISPLAYS

The invention relates to supertwist nematic liquid-crystal displays (STN-LCDs) having short switching times and good steepnesses and angle dependencies, and to the novel nematic liquid-crystal mixtures used therein.

STN-LCDs as in the heading are known, for example from EP 0,131,216 B1; DE 3,423,993 A1; EP 0,098,070 A2; M. Schadt and F. Leenhouts, 17th Freiburg conference on liquid crystals (Apr. 8–10, 1987); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L1784–L1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters, Vol. 4 (1), pp. 1–8 (1986). The term STN-LCD here includes any relatively highly twisted display element having a twist angle with a value between 160° and 720°, such as, for example, the display elements of Waters et al. (C. M. Waters et al., Proc. Soc. Inf. Disp. (New York) (1985) (3rd Intern. Display Conference, Kobe, Japan), the STN-LCDs (DE OS 3,503,259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP OS 0,246,842) or BW-STN-LCDs (K. Kawasaki et al., SID 87 Digest 391 (20.6)).

Compared with standard TN displays, STN-LCDs of this type are distinguished by significantly better steepnesses of the electrooptical characteristic curve (in the following simply called 'steepness') and, associated therewith, better contrast values, and by a significantly lower angle dependence of the contrast. Of particular interest are STN-LCDs with extremely short switching times, in particular also at relatively low temperatures. In order to achieve short switching times, the rotational viscosities, in particular of the liquid crystal mixtures have hitherto been optimized using usually optimized combinations of liquid crystal components and optionally also monotropic additives of relatively high vapour pressure.

However, the switching times achieved were not adequate for all applications.

Shorter switching times can also be achieved by reducing the thickness of LC, layer of the STN-LCD and using liquid-crystal mixtures with a higher birefringence Δn.

All these approaches to shorter switching times, however, still end up with mixtures which were not adequate for every use.

Further demands for STN-LCD are a higher multiplexability (resulting in a smaller number of driving IC's), lower threshold voltages and a high steepness.

To achieve a high steepness in STN-LCDs, the liquid crystal mixtures should exhibit comparatively high values of the ratio of the elastic constants $K_{33}/K_{11}$ and comparatively low values of $\Delta\epsilon/\epsilon_\perp$, wherein $\Delta\epsilon$ is the dielectric anisotropy and $\epsilon_\perp$ is the dielectric constant in vertical direction to the long molecular axis.

Apart of the optimization of the contrast and the switching times such liquid crystal mixtures should fulfill further important requirements such as:

1. A broad d/p window of cell gap d and pitch p, which is defined as the range between the lower and upper limit of the d/p values.
2. A high chemical stability.
3. A high electrical resistance.
4. A low dependence of the threshold voltage on temperature and frequency.

Optimal parameters, however, cannot be achieved simultaneously for all the properties mentioned above because of opposite influence of different material parameters such as dielectric and elastic properties. Thus, the parameter combinations achieved so far are still not sufficient, especially for high multiplex STN-LCDs (with a multiplex rate in the range of 1/400), but also for middle and low multiplex STN-LCD (multiplex rate in the range of 1/64 and 1/16, respectively).

Therefore, there continues to be a great demand for improved STN-LCDs having short switching times and, at the same time, a broad service-temperature range, a high steepness (i.e. low steepness values), good angle dependency of the contrast and low threshold voltage, which meet the abovementioned requirements.

The invention has the object of providing STN-LCDs which only have the above mentioned disadvantages to a small extent, or not at all, and at the same time have very useful overall properties, especially short switching times at low temperatures and a high steepness.

It has now been found that this object can be achieved if nematic liquid-crystal mixtures are used which comprise compounds having a 3,4,5-trifluorophenyl group together with compounds of formula I

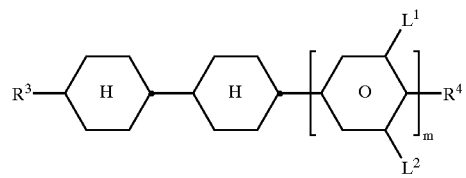

wherein
$R^3$ is an alkenyl group with 2 to 7 C atoms,
$R^4$ is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, or, in case m=1, $R^4$ can also be Q—Y,
Q is $CF_2$, $OCF_2$, CFH, OCFH or a single bond,
Y is F or Cl,
$L^1$ and $L^2$ are each independently H or F, and
m is 0 or 1.

The use of compounds of having a 3,4,5-trifluorophenyl group together with compounds of formula I in the liquid crystal mixtures for STN-LCDs according to the invention especially leads to
a high steepness
a low threshold voltage with a low temperature dependence, and
short switching times especially at low temperatures.

Furthermore, the liquid crystal mixtures according to the present invention show the following advantageous properties
a low viscosity,
a low temperature dependence of the threshold voltage and the operating voltage,
improved stability of the mixture in the display at low temperatures.

The invention thus relates to an STN-LCD having two plane-parallel outer plates which, together with a frame, form a cell, a nematic liquid-crystal mixture of positive dielectric anisotropy which is present in the cell, electrode layers with superposed alignment layers on the insides of the outer plates, a pre-tilt angle between the longitudinal axis of the molecules at the surface of the outer plates and the outer plates of from about 1 degree to 30 degrees, and a twist angle of the liquid-crystal mixture in the cell from alignment layer to alignment layer with a value of between 22.5 and 600°, wherein the nematic liquid-crystal mixture essentially consists of a) 30–90% by weight of a liquid-crystalline component A, comprising one or more compounds having a dielectric anisotropy of more than +1.5;

b) 10–45% by weight of a liquid-crystalline component B, comprising one or more compounds having a dielectric anisotropy from −1.5 to +1.5;

c) 0–10% by weight of a liquid-crystalline component D, comprising one or more compounds having a dielectric anisotropy of less than −1.5 and d) optionally an optically active component C in such an amount that the ratio between the layer thickness (separation of the plane-parallel outer plates) and the natural pitch of the chiral nematic liquid-crystal mixture is from about 0.2 to 1.3, characterized in that the liquid crystal mixture comprises at least one compound of component A having a 3,4,5-trifluorophenyl group, and at least one alkenyl compound of formula I

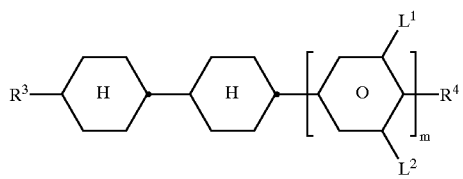

I wherein $R^3$ is an alkenyl group with 2 to 7 C atoms, $R^4$ is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, or, in case m=1, $R^4$ can also be Q—Y, Q is $CF_2$, $OCF_2$, CFH, OCFH or a single bond, Y is F or Cl, $L^1$ and $L^2$ are each independently H or F, and m is 0 or 1.

Another object of the invention is providing the inventive crystal mixtures as described above and below for use in STN-LCDs.

The formula I comprises the following subformulae

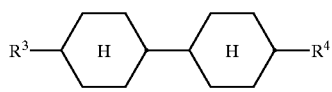

I-1

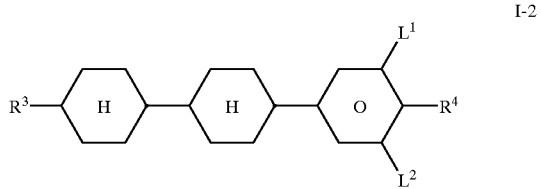

I-2

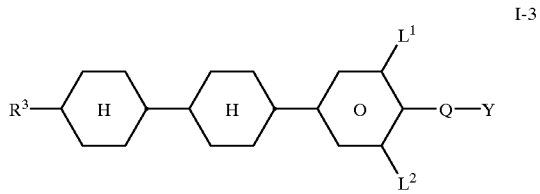

I-3 wherein $R^3$, $L^1$, $L^2$, Q and Y have the meanings of formula I and $R^4$ is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another.

In the formulae I-1, I-2 and I-3, $R^3$ is especially preferably 1 E-alkenyl or 3 E-alkenyl with 2 to 7 C-atoms.

Especially preferred compounds of formula I-1 are those wherein $R^4$ is alkenyl with 2 to 7 C atoms, in particular those of the following formulae

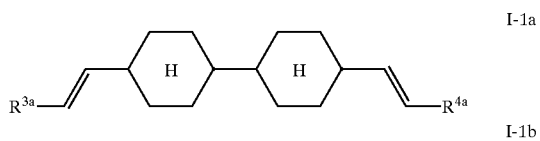

I-1a

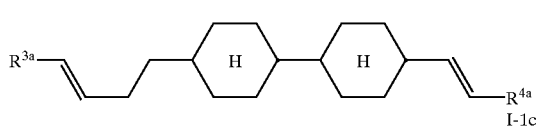

I-1b

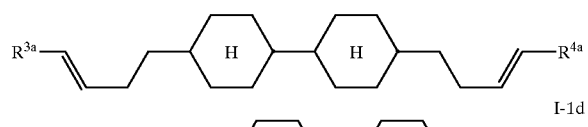

I-1c

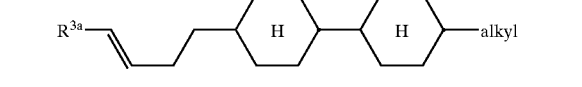

I-1d wherein $R^{3a}$ and $R^{4a}$ are each independently H, $CH_3$, $C_2H_5$ or n-$C_3H_7$ and alkyl is an alkyl group with 1 to 7 C atoms.

Particularly preferred are STN-LCDs according to the present invention, wherein the liquid crystal mixture comprises at least one compound selected of formulae I-1a and I-1c, wherein $R^{3a}$ and $R^{4a}$ respectively have the same meaning.

Of the compounds of formula I-2 especially preferred are those wherein $L^1$ and $L^2$ are denoting H.

Further preferred compounds of formula I-2 are those wherein $R^4$ is alkyl with 1 to 8, in particular 1, 2 or 3

C-atoms, and R³ is 1E-alkenyl or 3E-alkenyl with 2 to 7, in particular 2, 3 or 4 C-atoms.

Of the compounds of formula I-3 especially preferred are those wherein one or both of L¹ and L² are denoting F and Q—Y is F or OCF₃.

Further preferred compounds of formula I-3 are those wherein R³ is 1E-alkenyl or 3E-alkenyl with 2 to 7, in particular 2, 3 or 4 C-atoms.

The compounds of formulae I-1 and I-2 having a dielectric anisotropy from −1.5 to +1.5 belong to component B as defined above, whereas polar compounds of formula I-2 and in particular of formula I-3 having a dielectric anisotropy of more than +1.5 belong to component A as defined above.

The use of compounds of formula I leads to inventive mixtures with particularly low values of the rotational viscosity and to STN-LCD's with a high steepness of the electrooptical curve and fast switching times especially at low temperatures.

The compounds of component A having a 3,4,5-trifluorophenyl group are preferably selected of formula II

II

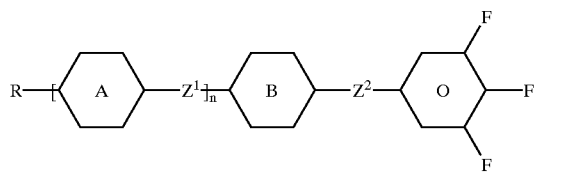

wherein

R is an optionally fluorinated alkyl, alkoxy, alkenyl or alkenyloxy group with 1 to 12 C atoms, wherein one or two non-adjacent CH₂ groups can be replaced by —O—, —CH=CH—, —CO—, —OCO— or —COO— in such a manner that O atoms are not directly adjacent to one another,

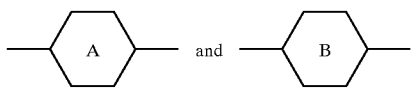

are each independently

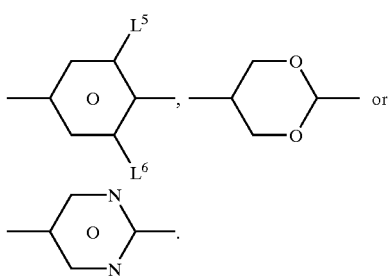

L⁵ and L⁶ are each independently H or F,

Z¹ and Z² are independently of each other —COO—, —CH₂CH₂—, —CH=CH—, —C≡C— or a single bond, and n is 0, 1 or 2.

Especially preferred compounds of formula II are those of the following formulae IIa
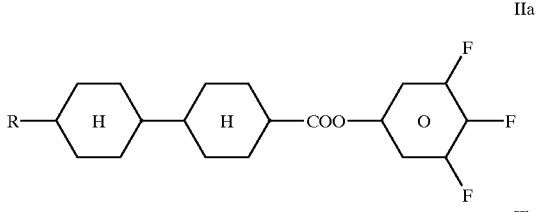

IIb
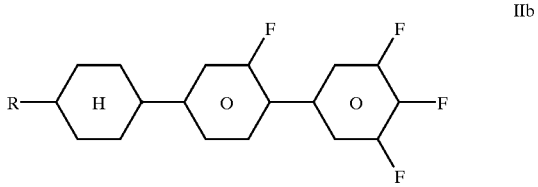

IIc
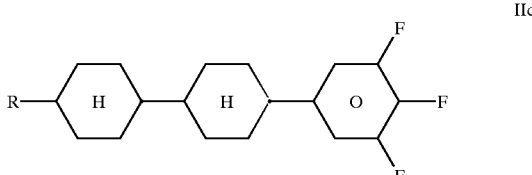

IId
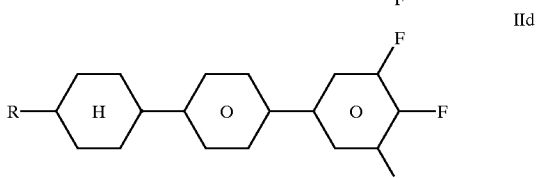

IIe
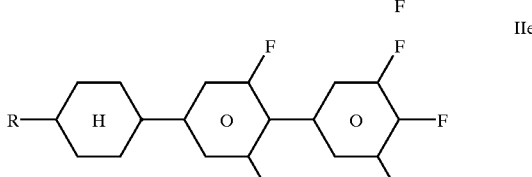

IIf
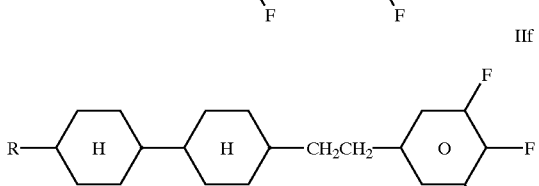

IIg

IIg
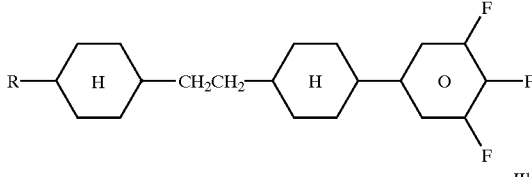

IIh
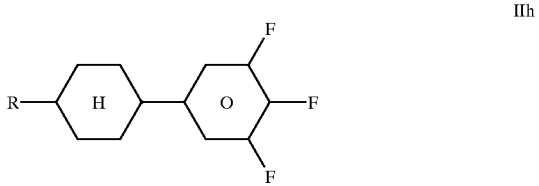

wherein R is as defined in formula II. R in these formulae is particularly preferably alkyl or alkoxy with 1 to 8 C atoms.

Especially preferred are compounds of formula IIa, IIb, IIc, IId and IIe, in particular compounds of formula IIa and IIb.

Preferably component A further comprises one or more compounds of formula III

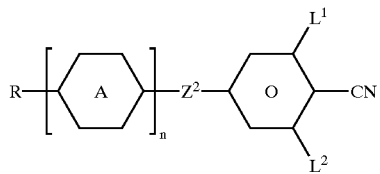

III wherein R, A, $Z^2$ and n have each independently one of the meanings of formula II and $L^1$ and $L^2$ are each independently H or F.

The compounds of formula III are preferably selected from the following formulae

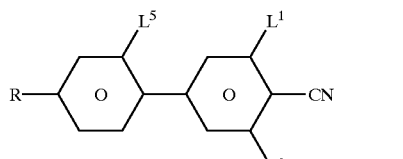

IIIa

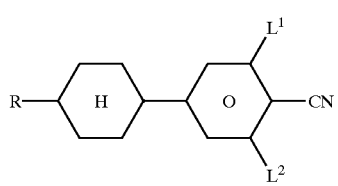

IIIb

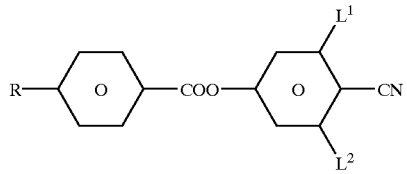

IIIc

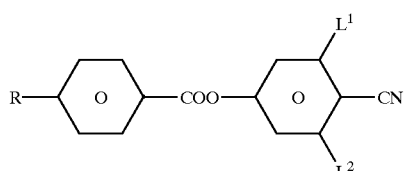

IIId

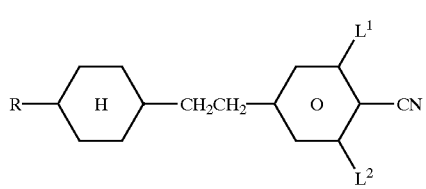

IIIe

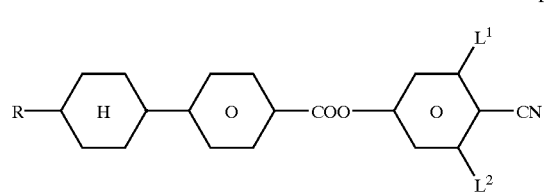

IIIf

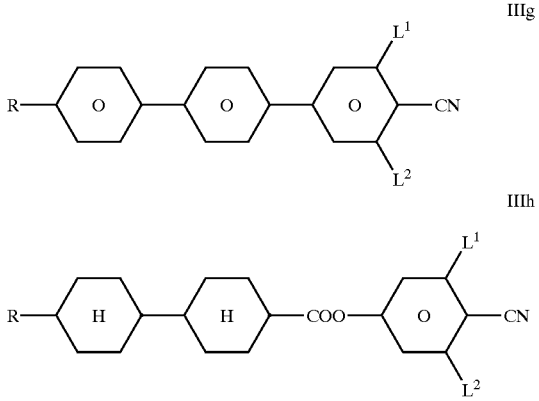

IIIg

IIIh wherein R, $L^1$ and $L^2$ have each independently one of the meanings of formula III.

Especially preferred are compounds of formula IIIb, IIIc and IIIf, in particular compounds of the following subformulae

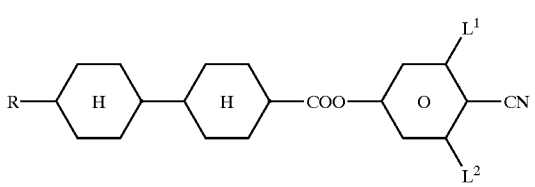

IIIb1

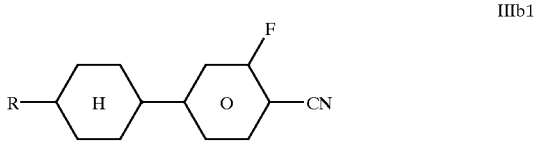

IIIb2

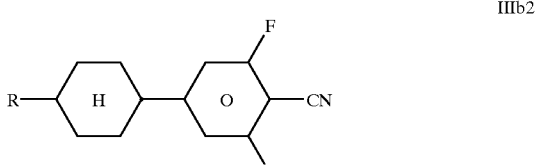

IIIc1

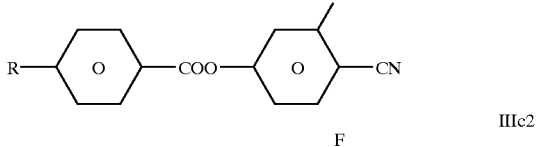

IIIc2

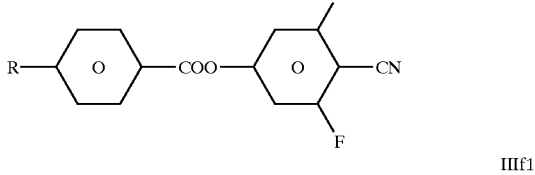

IIIf1

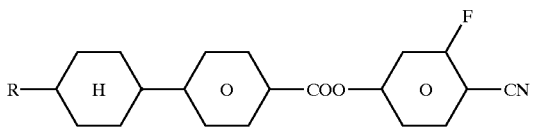

IIIf2

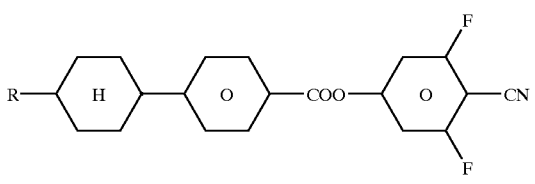

wherein R is as defined in formula III.

Further preferred are compounds of formula IIIh, wherein $L^2$ is H and $L^1$ is H or F, in particular F.

Preferably the liquid crystal mixtures according to the present invention comprise one or more compounds of formula V

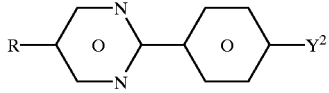

V wherein R has one of the meanings of formula II and $Y^2$ is F or Cl, in particular wherein R is alkyl or alkoxy with 1 to 8 C-atoms and/or $Y^2$ is F.

In addition to compounds of formula II, the component A can also comprise one or more compounds with terminal fluoro or fluorinated groups selected of formula II*

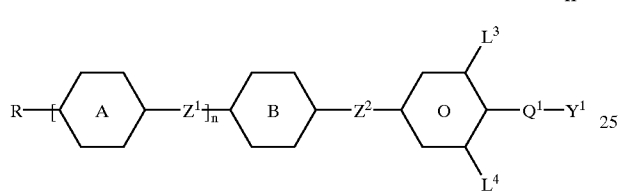

II* wherein
R, A, B, $Z^1$, $Z^2$ and n have each independently one of the meanings of formula II,
$L^3$ and $L^4$ are each independently H or F,
$Y^1$ is F or Cl, and
$Q^1$ is $CF_2$, $OCF_2$, CFH, OCFH or a single bond,
with the provisos that $L^3$, $L^4$ and $Q^1$—$Y^1$ are not at the same time F, and that in case n is 1, A and B are both 1,4-cyclohexylene and $Z^1$ and $Z^2$ are single bonds, then R is not an alkenyl group with 2 to 7 C atoms.

Especially preferred compounds of formula II* are those of the following formulae II*a
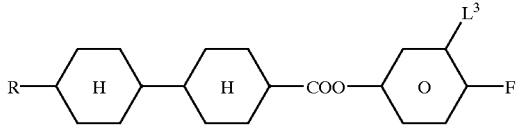

II*b
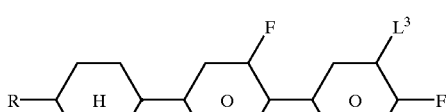

II*c
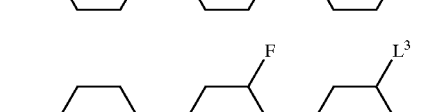

II*d
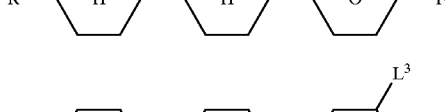

II*e
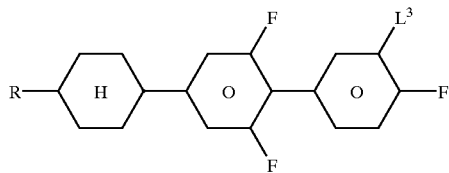

II*f
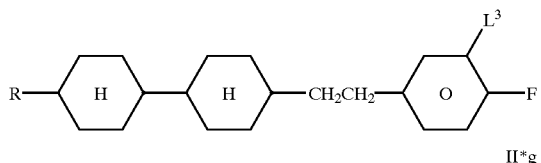

II*g
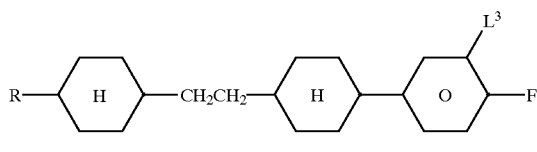

II*h
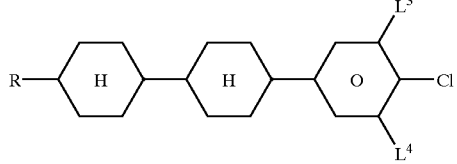

II*i
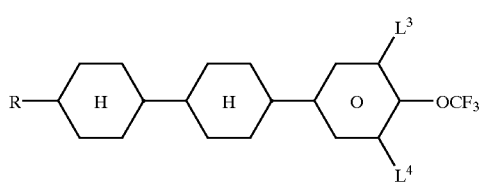

II*k
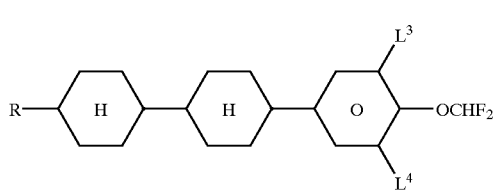

II*m
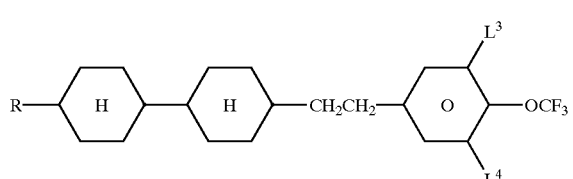

II*n
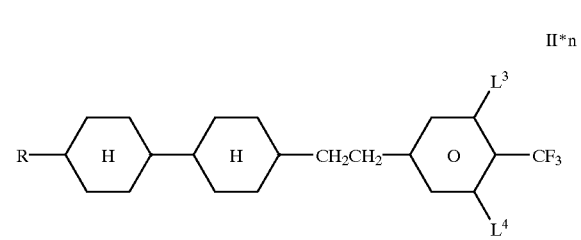

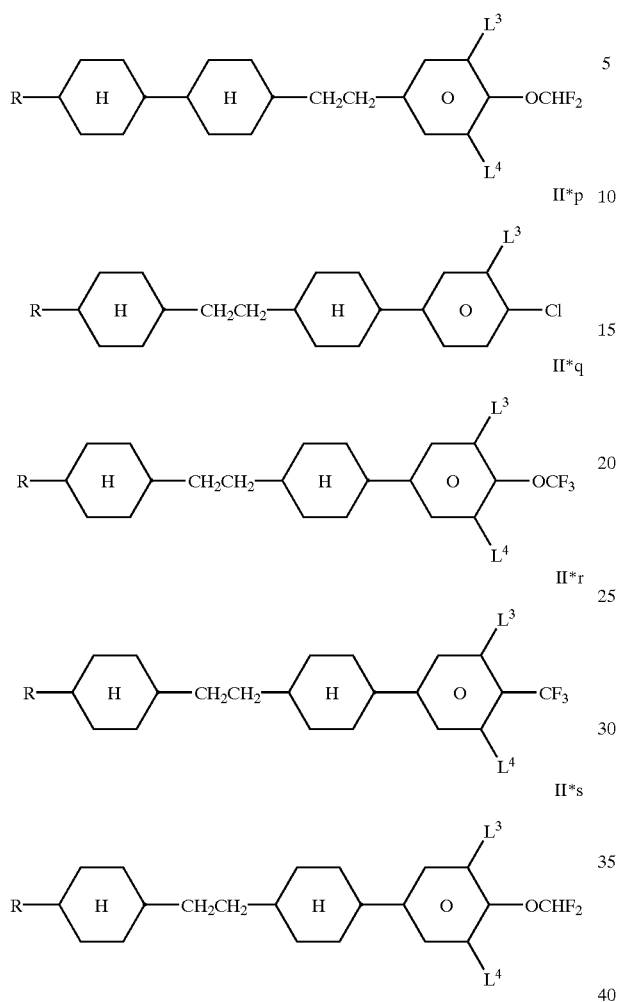

wherein R is as defined in formula II, and $L^3$ and $L^4$ are each independently H or F. R in these formulae is particularly preferably alkyl or alkoxy with 1 to 8 C atoms.

The individual compounds of the formulae I, II, II*, III, V and also other compounds which can be used in the STN-LCDs according to the invention, are either known or can be prepared analogously to the known compounds.

In particular the compounds of the formulae I have low viscosities, in particular low rotational viscosities, low values of the ratio of the elastic constants ($K_3/K_1$) and lead therefore to short switching times, whereas the compounds of formula II with a high dielectric anisotropy, especially when being present in high amounts like in the inventive displays, lead to a reduced threshold voltage.

Preferred liquid-crystal mixtures which can be used according to the invention contain one or more compounds from component A preferably in a proportion of 30% to 90%, preferably 45% to 75%. These compounds or this compound have a dielectric anisotropy of more than +3 (preferably of more than +8, in particular more than +12).

Further preferred mixtures comprise
- one or more, in particular two to five compounds of formula I,
- one or more, in particular two to six compounds of formula II,
- one or more, in particular two to six compounds of formula III, and
- one or more, in particular one, two or three compounds of formula V.

Preferred liquid-crystal mixtures contain one or more compounds from group B, preferably in a proportion of 10 to 45%. These compounds or this compound from group B have in particular low values of the rotational viscosity $\gamma_1$.

Preferably component B comprises one or more compounds selected from the group comprising IV1 to IV9 with two rings

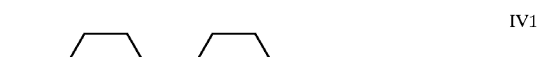
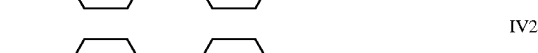
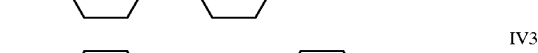
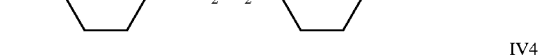
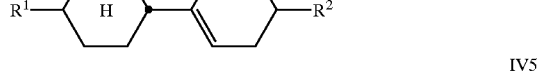
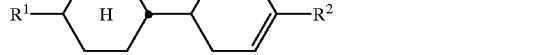
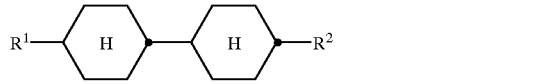
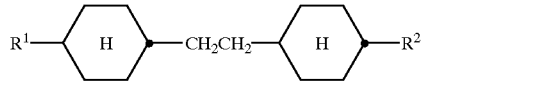
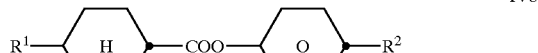

and/or one or more compounds selected from the group comprising IV10 to IV24 with three rings

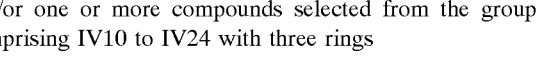
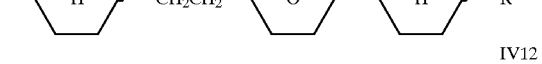

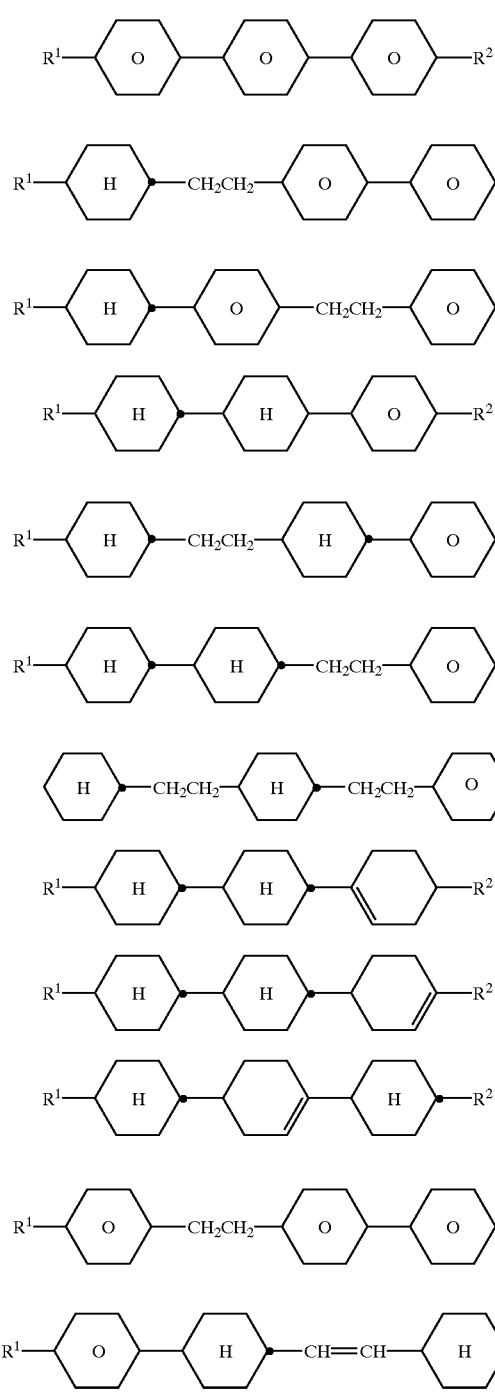
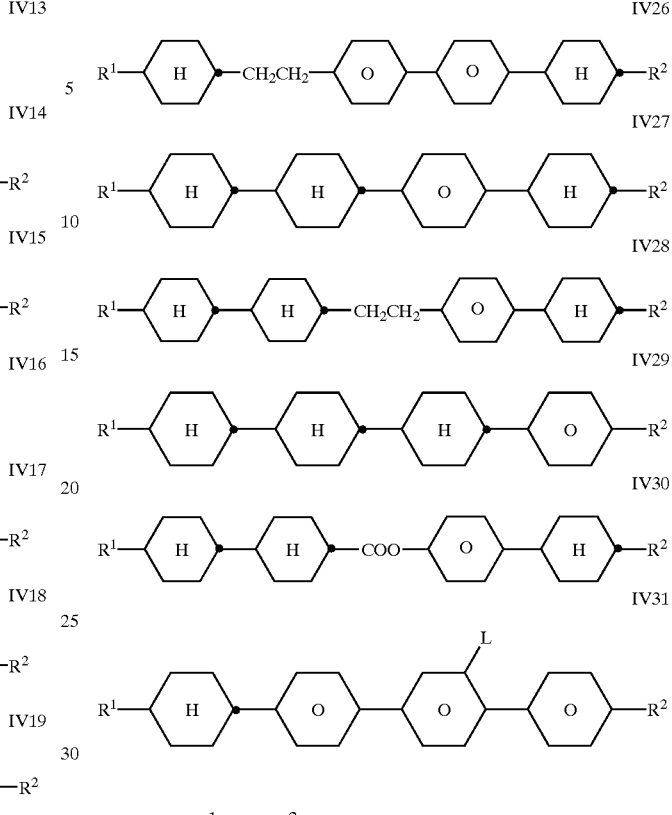

and/or one or more compounds selected from the group comprising IV10 to IV24 with three rings

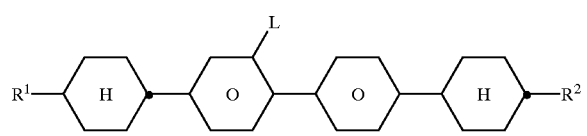

in which $R^1$ and $R^2$ have each independently one of the meanings given for R in formula II, L is H or F, and the 1,4-phenyl groups in IV10 to IV19 and IV23 to IV31 can also independently of each other be mono- or polysubstituted by F.

Of the compounds of formulae IV 25 to IV 31 especially preferred are those wherein $R^1$ is alkyl and $R^2$ is alkyl or alkoxy, each having 1 to 7 C-atoms. Further preferred are compounds of formulae IV 25 and IV 31 wherein L is F.

$R^1$ and $R^2$ in the compounds of formulae IV1 to IV30 is particularly preferably straight chain alkyl or alkoxy with 1 to 12 C-atoms.

The LC mixtures optionally also comprise an optically active component C, in an amount such that the ratio between the layer thickness (separation of the plane-parallel carrier plates) and the natural pitch of the chiral nematic liquid crystal mixture is more than 0.2 suitable to the desired twist angle. Suitable dopants can be selected from a wide variety of known chiral materials and commercially available dopants such as cholesteryl nonanoate, S 811 (Merck KGBA, Darmstadt, FRG) and CB 15 (Merck Ltd., former, BDH, Poole, UK). The choice thereof is not crucial per se.

The amount of compounds of component C is preferably 0 to 10%, in particular 0 to 5%, very preferably 0 to 3%.

In a further preferred embodiment the LC mixtures comprise 2 to 65%, preferably 5 to 35% by weight of liquid crystalline tolane compounds. Thereby it is possible to reduce the cell thickness and the switching times of the STN-LCDs. The tolane compounds are preferably selected from group T comprising T1a, T1b and T2a to T2h

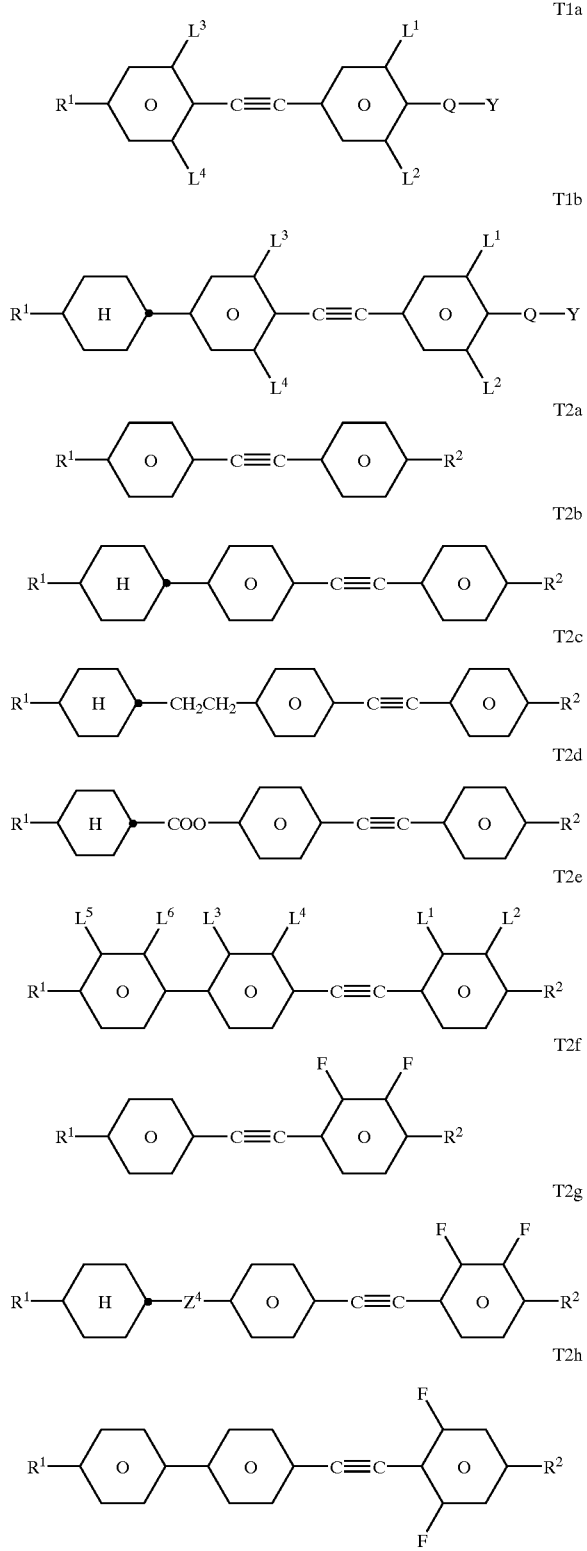

wherein R¹ has one of the meanings of R in formula II, L¹ to L⁶ are each independently H or F, and Q and Y have one of the meanings given in formula I.

Particularly preferred compounds of formula T2e are those wherein one, two or three of the groups L¹ to L⁶ are F and the others are H, with both of L¹ and L², L³ and L⁴, L⁵ and L⁶ not being at the same time F.

The proportion of component(s) from group T is preferably 2% to 65%, in particular 5% to 35%.

The liquid crystal mixtures may also comprise 0 to 10% of one or more compounds having a dielectric anisotropy of −2 or less (component D).

The component D preferably comprises one or more compounds containing the structural element 2,3-difluoro-1,4-phenylene, such as described e.g., in DE-OS 38 07 801 (which corresponds to U.S. Pat. No. 5,248,447), 38 07 861 (which corresponds to U.S. Pat. No. 5,204,019), 38 07 863(which corresponds to U.S. Pat. No. 5,236,620), 38 07 864 and 38 07 908. Especially preferred are tolane compounds with this structural element according to the PCT/DE 88/00133 which corresponds to U.S. Pat. No. 5,198,149, in particular those of formulae T2f and T2g.

Further known compounds of component D are e.g., 2,3-Dicyano-hydroquinone or cyclohexane derivatives containing the structural element

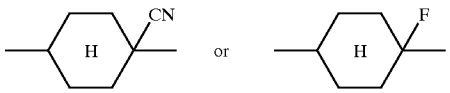

as in DE-OS 32 31 707 or DE-OS 34 07 013 which are priority documents of U.S. Pat. Nos. 4,510,069; 4,985,583: 4,986,931 and 5,108,652.

The proportion of compounds of the component D comprising one or more compounds having a dielectric anisotropy <−1.5 is preferably about 0% to 10%, in particular about 0% to 5%. Those skilled in the art can easily adjust this proportion to produce the threshold voltage desired, it being possible to use, in principle, all customary liquid-crystal compounds where $\Delta\epsilon < -1.5$.

Especially preferably the inventive displays contain no compounds of component D.

The term alkenyl in the meanings of R and R¹ to R⁴ is comprising straight chain and branched alkenyl groups, in case of R with 2 to 7 C atoms, in case of R, R², R³ and R⁴ with 2 to 12 C atoms. Straight chain alkenyl groups are preferred. Further preferred alkenyl groups are $C_2$–$C_4$-1E-alkenyl, $C_4$–$C_7$-3E-alkenyl, $C_5$–$C_7$-4-alkenyl, $C_6$–$C_7$-5-alkenyl and $C_{7-6}$-alkenyl, in particular $C_2$–$C_7$-1E-alkenyl, $C_4$–$C_7$-3E-alkenyl and $C_5$–$C_7$-4-alkenyl.

Examples for preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Alkenyl groups with up to 5 C atoms are particularly preferred. Very particularly preferred are vinyl, 1E-propenyl, 1E-butenyl, 3E-butenyl and 3E-pentenyl, in particular vinyl and 3E-butenyl.

In further particularly preferred embodiments, the liquid crystal mixtures according to the present invention contain at least one compound of each formula I-1a, I-2a and I-3a

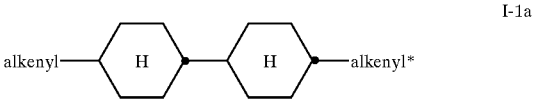

-continued

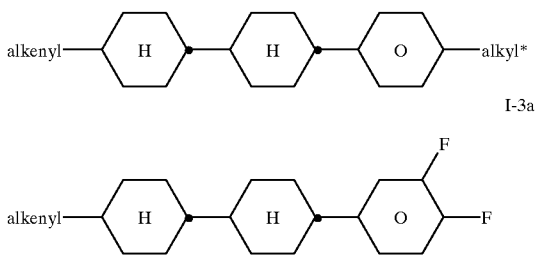

wherein alkenyl and alkenyl* are each independently an alkenyl group with 2 to 7 C atoms, and alkyl* is an alkyl group with 1, 2 or 3 C atoms, one or more, preferably two to six, compounds of formulae IIa and IIb, 11 to 55%, preferably 18 to 42% by weight of one or more, in particular three to five, alkenyl compounds of formula I, 12 to 24% by weight of one or more, in particular one or two, polar alkenyl compounds of formula I-3, 11 to 44%, preferably 16 to 32% by weight of one or more, in particular two to six, compounds having 3,4,5-trifluorophenyl group, which are especially preferably selected of formula II, 12 to 48%, preferably 18 to 36% by weight of one or more, in particular two to six, compounds of formula III having a terminal cyano group, which are especially preferably selected of formulae IIIb and IIIc, 2 to 16%, preferably 3 to 9% by weight of one or more, in particular one or two, pyrimidine compounds of formula V, 2 to 35% preferably 5 to 20% by weight of one or more, in particular two to four, tolane compounds of group T, which are especially preferably selected from formulae T2a and T2b, Further preferred embodiments relate to liquid crystal mixtures that contain a total of 4 to 10 compounds of formulae I and II, with the amount of these compounds being 25 to 70%, preferably 35 to 65% by weight of the total mixture, contain more than 58% by weight of compounds having a positive dielectric anisotropy, in particular having a dielectric anisotropy of more than +12, contain no compounds of component B of formulae IV-1 to IV-31 and/or no compounds of component D, essentially consist of compounds of formulae I, II, III, V and compounds of group T, The inventive mixtures are characterized, especially when used in STN-LCDs with large cell gaps, by their low total switching times ($t_{tot}=t_{on}+t_{off}$). Low switching times are an especially important requirement for STN-LCDs e.g. when used in laptops, to allow better displaying of the cursor movements. Especially preferred are displays having switching times of 300 msec or less, in particular 250 msec or less.

The inventive STN-LCDs are characterized by a low threshold voltage. Preferably the threshold voltage is 1.5 V or less, in particular 1.35 V or less.

The liquid crystal mixtures in the inventive STN-LCDs are dielectrically positive with $\Delta\epsilon \geq 1.5$. Particularly preferred are mixtures with $\Delta\epsilon \geq 3$, very particularly preferred mixtures with $\Delta\epsilon \geq 5$.

The inventive liquid crystal mixtures exhibit advantageous values of the threshold voltage $V_{10/0/20}$ and of the rotational viscosity $\gamma_1$. If the value for the optical path difference $d \cdot \Delta n$ is fixed, the value for the cell gap d is determined by the optical anisotropy $\Delta n$. In particular in case of high values of $d \cdot \Delta n$, the use of liquid crystal mixtures according to the present invention with a higher value of $\Delta n$ is preferred, since in this case the value for d can be chosen to be comparatively small, leading to improved values of the switching time. However, inventive liquid crystal displays comprising inventive liquid crystal mixtures with smaller values of $\Delta n$, too, are characterized by advantageous values of the switching times.

The liquid crystal mixtures according to the present invention are further characterized by their advantageous values of the steepness, and, in particular at temperatures above 20° C., can be driven at high multiplex rates. Furthermore, the mixtures exhibit a high stability, a high electrical resistance and a low frequency dependency of the threshold voltage. The liquid crystal displays according to the present invention show a broad working temperature range and a good viewing angle dependency of the contrast.

The construction of the liquid-crystal display elements according to the present invention from polarizers, electrode base plates and electrodes having a surface treatment such that the preferential orientation (director) of the liquid-crystal molecules in each case adjacent thereto is usually mutually twisted from one electrode to the other by a value of 160° to 720°, corresponds to the customary construction for display elements of this type. The term customary construction here is used in broad terms and also includes all derivatives and modifications of supertwist cells, in particular also matrix display elements. The surface tilt angle at the two support plates may be identical or different. Identical tilt angles are preferred.

In TN-displays according to the invention the tilt angle between the long axes of the molecules at the surface of the base plates and the base plate is preferably, in the range from 0° to 7°, in particular from 0,01° to 5°, very preferably from 0,1 to 2°. In STN-displays according to the invention the tilt angle is preferably in the range from 1° to 30°, in particular from 1° to 12°, very preferably from 3° to 10°.

The twist angle of the liquid crystal mixture between the alignment layers on the two base plates of the cell is in case of inventive TN-displays in the range from 22,5° to 170°, in particular from 45° to 130°, very preferably from 80° to 115°. In case of STN-displays the twist angle is in the range from 100° to 600°, in particular from 170° to 300°, very preferably from 180° to 270°.

An essential difference between the display elements according to the invention and the display elements customary hitherto based on the twisted nematic cell is, however, the choice of liquid-crystal components in the liquid-crystal layer.

The liquid-crystal mixtures which can be used according to the invention are prepared in a manner customary per se. In general, the desired amount of the components used in a relatively small amount is dissolved in the components making up the principal constituent, expediently at elevated temperature. It is also possible to mix solutions of the components in an organic solvent, for example in acetone, chloroform or methanol, and to remove the solvent again, after mixing, for example by distillation.

The dielectrics may also contain further additives known to those skilled in the art and described in the literature. For example, 0–15% of pleochroic dyes may be added.

The examples below are intended to illustrate the invention, without representing any limitation whatsoever.

The abbreviations have the following meanings:

| | |
|---|---|
| Δn | birefringence at 589 nm and 20° C., |
| $T_{ave}$ | average switching time = 0.5 ($T_{on}$ + $T_{off}$), |
| $T_{on}$ | time from switching on until 90% of the maximum contrast is reached, |
| $T_{off}$ | time from switching off until 10% of the maximum contrast is reached, |
| $V_{10}$ | threshold voltage (volt) at a frequency of 50 Hz, |
| $V_{90}$ | saturation voltage (volt) at a frequency of 50 Hz, |
| $V_{90}/V_{10}$ | steepness, |
| γrot | rotational viscosity (mPa · s), |
| ν | flow viscosity at 20° C. (mm²s · 1), |
| HTP | helical twisting power of the chiral dopant S-811 at 20° C. (µm⁻¹), |
| d · Δn | optical retardation at 20° C. (µm), |
| d/P | ratio of cell gap versus cholesteric pitch at 20° C.: 0.54 for a twist of 240°, if not explicitly stated otherwise and |
| Twist | twist angle between the surfaces: 240°, if not explicitly stated otherwise. |

In the foregoing and the following, unless indicated otherwise, all temperatures are in degree Celsius and percentages are % by weight. The values for switching times and viscosities are related to 20° C. The switching time is the average value $t_{ave}$ as defined above.

The STN-LCD is addressed in multiplex operation (multiplex ratio 1:240, bias 1:15).

The concentrations of the constituents of the liquid crystalline mixtures are given without consideration of the chiral dopant used. The concentration of the chiral dopant is chosen to achieve the desired value of d/P, wherein the cell gap d is determined via the birefingence of the liquid crystalline mixture from the optical retardation dΔn. All examples given use the chiral dopant S-811, available from Merck KGBA, unless explicitly stated otherwise.

In the present patent application and in the following examples all chemical structures of LC compounds are given by acronyms the transformation of which into chemical formulae is done as shown in the following. All residues $C_nH_{2n+1}$ and $C_mH_{2m+1}$ are straight-chained alkyl groups with n resp. m carbon atoms. The code of Table B is self-explanatory. In Table A only the acronym for the core structure is given. In a concrete compound this acronym is followed by a dash and a code for the substituents $R^1$, $R^2$, $L^1$ and $L^2$ as follows:

The entire disclosure of all applications, patents and publications, cited above, and of corresponding application European Patent Application EP 98121578.3 filed Nov. 19, 1998 are hereby incorporated by reference.

The compounds given in Tables A and B are particularly preferred components of the present invention.

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nOmFF | $C_nH_{2n+1}$ | $OC_mH_{2m+1}$ | F | F |
| nmF | $C_nH_{2n+1}$ | $C_mH_{2m+1}$ | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_2$ | $C_nH_{2n+1}$ | $OCHF_3$ | H | H |
| nF.Cl | $C_nH_{2n+1}$ | Cl | H | F |
| n-V | $C_nH_{2n+1}$ | —CH=CH₂ | H | H |
| Vn-m | —CH=CH—$C_nH_{2n+1}$ | $C_mH_{2m+1}$ | H | H |

TABLE A ($L^1$, $L^2$, $L^3$; H or F)

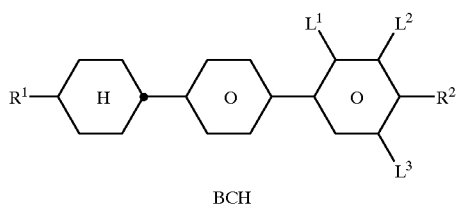

BCH

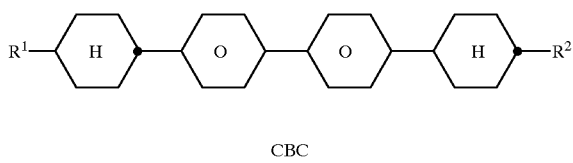

CBC

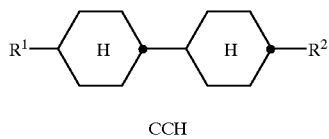

CCH

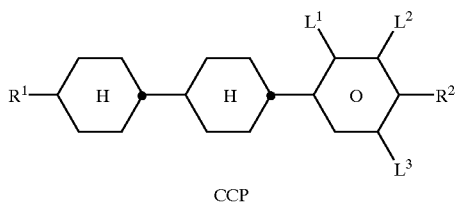

CCP

TABLE A-continued
($L^1$, $L^2$, $L^3$; H or F)
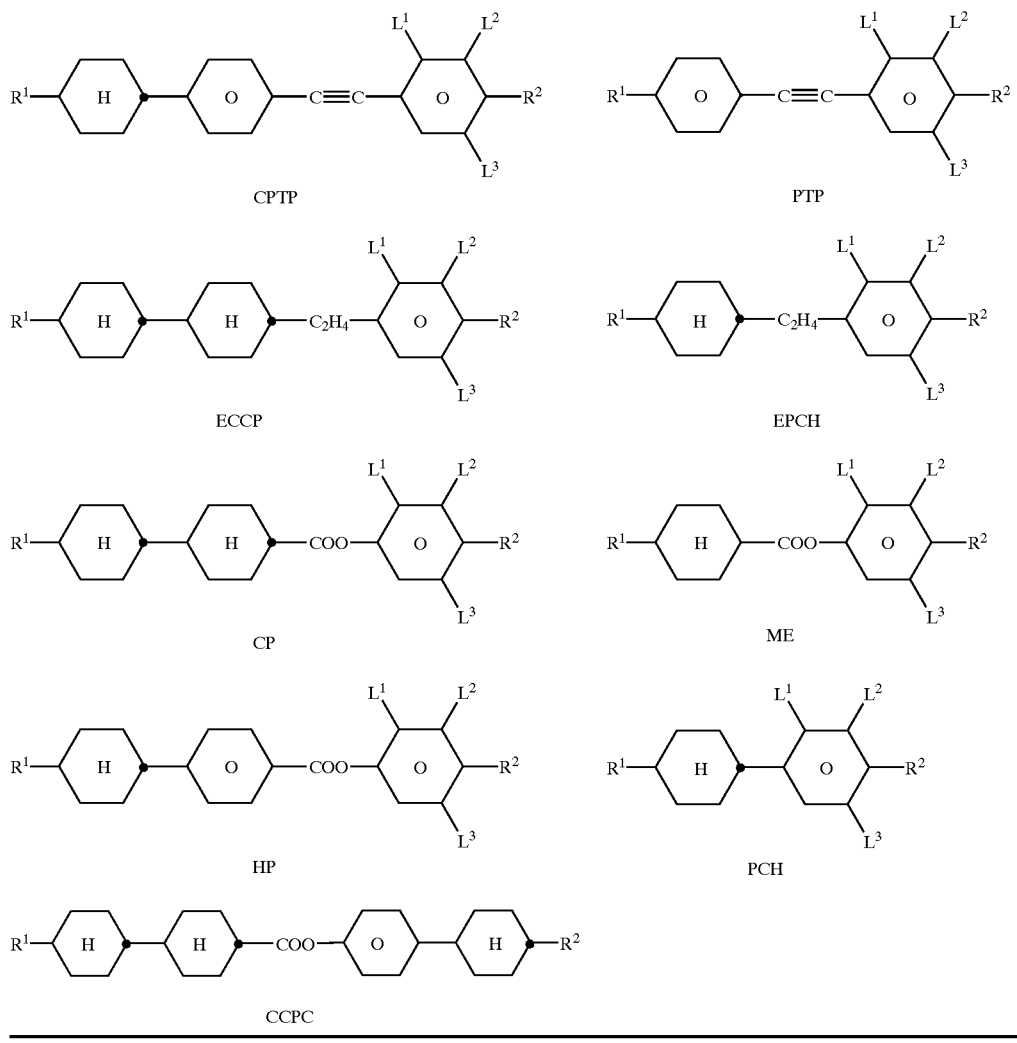
TABLE B
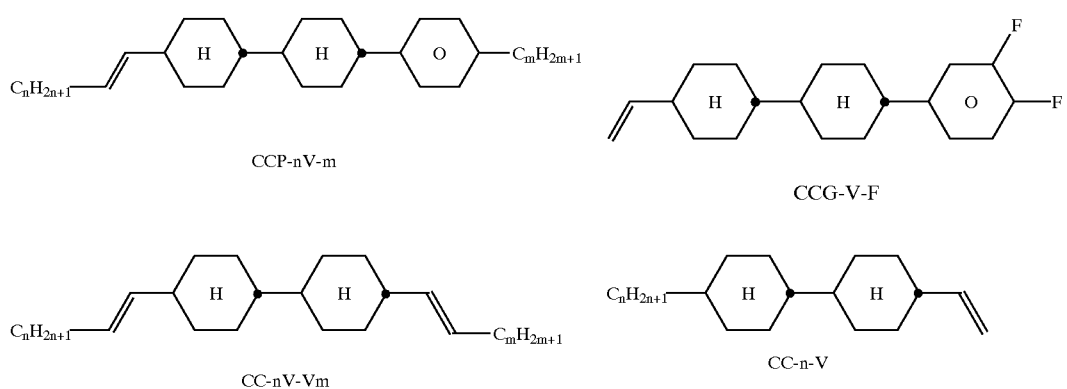

TABLE B-continued

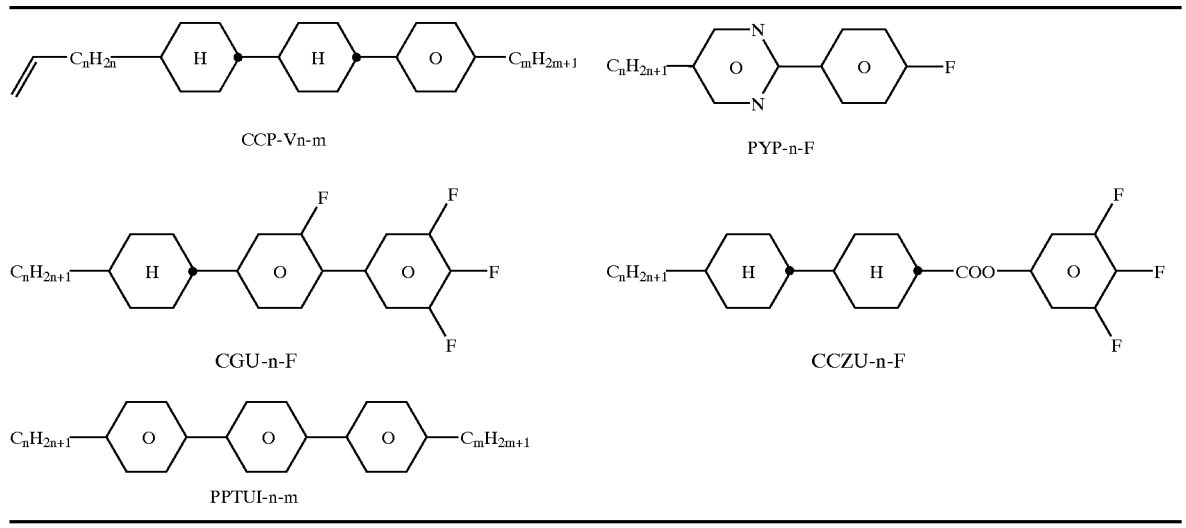

EXAMPLE 1

A STN display contains a liquid crystalline medium with the following properties:

| | |
|---|---|
| Clearing point | +75° C. |
| Δn(20° C., 589 nm) | 0.1373 |
| $V_{10}$(20° C.) | 1.25 V |
| $V_{90}/V_{10}$(20° C.) | 1.082 |
| $T_{ave}$(20° C.) | 220 msec |
| consisting of | c |
| PCH-3N.F.F | 18.00% |
| ME2N.F | 2.00% |
| ME3N.F | 3.00% |
| ME4N.F | 8.00% |
| PYP-5-F | 4.00% |
| CC-1V-V1 | 6.50% |
| CCG-V-F | 16.00% |
| CCP-V-1 | 6.00% |
| PTP-102 | 3.50% |
| CPTP-301 | 5.50% |
| CPTP-302 | 5.50% |
| CPTP-303 | 5.00% |
| CCZU-2-F | 2.00% |
| CCZU-3-F | 8.00% |
| CCZU-5-F | 2.00% |
| CGU-3-F | 5.00% |
| Σ | 100.00% |

EXAMPLE 2

A STN display contains a liquid crystalline medium with the following properties:

| | |
|---|---|
| Clearing point | +75° C. |
| Δn(20° C., 589 nm) | 0.1181 |
| $V_{10}$(20° C.) | 1.31 V |
| $V_{90}/V_{10}$(20° C.) | 1.070 |
| $T_{ave}$(20° C.) | 244 msec |
| consisting of | c |
| PCH-3N.F.F | 16.00% |
| ME2N.F | 2.00% |
| ME3N.F | 3.00% |
| ME4N.F | 7.50% |
| PYP-5-F | 4.00% |

-continued

| | |
|---|---|
| CC-1V-V1 | 3.00% |
| CCG-V-F | 16.00% |
| CCP-V-1 | 9.50% |
| CCP-V2-1 | 9.00% |
| CPTP-301 | 3.00% |
| CPTP-302 | 3.00% |
| CCZU-2-F | 3.00% |
| CCZU-3-F | 11.00% |
| CCZU-5-F | 3.00% |
| CGU-3-F | 5.00% |
| Σ | 100.00% |

EXAMPLE 3

A STN display contains a liquid crystalline medium with the following properties:

| | |
|---|---|
| Clearing point | +88.0° C. |
| Δn(589 nm, 20° C.) | +0.1427 |
| HTP (20° C.)/μm$^{-1}$ | −12.80 |
| d · Δn (20° C.)/μm | 0.85 |
| Twist | 240° |
| $V_{10}$(20° C.)/V | 0.86 |
| $V_{90}/V_{10}$(20° C.) | 1.064 |
| consisting of | c/% |
| ME2N.F | 8.00 |
| ME3N.F | 8.00 |
| ME4N.F | 16.00 |
| ME5N.F | 16.00 |
| HP-3N.F | 5.00 |
| HPAN.F | 5.00 |
| HP-5N.F | 3.00 |
| CCZU-2-F | 4.00 |
| CCZU-3-F | 8.00 |
| CCZU-5-F | 4.00 |
| CC-5-V | 11.50 |
| CPTP-301 | 3.50 |
| CCPC-33 | 5.00 |
| CCPC-34 | 3.00 |
| Σ | 100.00 |

EXAMPLE 4

A STN display contains a liquid crystalline medium with the following properties:

| Clearing point/° C. | +95.0° C. |
|---|---|
| Δn (589 nm, 20° C.) | +0.1478 |
| ν (20° C.) [mm²s⁻¹] | 32 |
| HTP (20° C.)/μm⁻¹ | −11.33 |
| d · Δn (20° C.)/μm | 0.85 |
| Twist | 240° |
| $V_{10}$(20° C.)/V | 1.35 |
| $V_{90}/V_{10}$(20° C.) | 1.092 |
| consisting of | c/% |
| PCH-3N.F.F | 18.00 |
| ME2N.F | 2.50 |
| ME3N.F | 3.00 |
| ME4N.F | 8.00 |
| PYP-5F | 4.50 |
| CC-3-V1 | 3.00 |
| CCP-V-1 | 12.00 |
| CCP-V2-1 | 4.00 |
| CCZU-2-F | 4.00 |
| CCZU-3-F | 12.00 |
| CCZU-5-F | 4.00 |
| CPTP-301 | 5.00 |
| PPTUI-3-2 | 10.00 |
| CBC-33F | 5.00 |
| CBC-53F | 5.00 |
| Σ | 100.00 |

EXAMPLE 5

A STN display contains a liquid crystalline medium with the following properties:

| Clearing point/° C. | +95.0° C. |
|---|---|
| Δn (589 nm, 20° C.) | +0.1477 |
| ν (20° C.) [mm²s⁻¹] | 27 |
| HTP (20° C.)/μm⁻¹ | −11.19 |
| d · Δn (20° C.)/μm | 0.85 |
| Twist | 240° |
| $V_{10}$(20° C.)/V | 1.35 |
| $V_{90}/V_{10}$(20° C.) | 1.086 |
| consisting of | c/% |
| PCH-3N.F.F | 15.00 |
| ME2N.F | 4.00 |
| ME3N.F | 4.00 |
| ME4N.F | 12.00 |
| CC-3-V1 | 5.00 |
| CCP-V-1 | 15.00 |
| CCP-V2-1 | 15.00 |
| CCZU-2-F | 3.00 |
| CCZU-3-F | 10.50 |
| PPTUI-3-2 | 13.00 |
| CBC-33F | 3.50 |
| Σ | 100.00 |

EXAMPLE 6

A STN display contains a liquid crystalline medium with the following properties:

| Clearing point/° C. | +75.0° C. |
|---|---|
| Δn (589 nm, 20° C.) | +0.1266 |
| ν (20° C.) [mm²s⁻¹] | 28 |
| HTP (20° C.)/μm⁻¹ | −11.95 |
| d · Δn (20° C.)/μm | 0.85 |
| Twist | 240° |
| $V_{10}$(20° C.)/V | 1.18 |
| $V_{90}/V_{10}$(20° C.) | 1.084 |
| consisting of | c/% |
| PCH-3N.F.F | 19.00 |
| ME2N.F | 2.00 |
| ME3N.F | 3.00 |
| ME4N.F | 9.00 |
| PYP-5F | 5.00 |
| CC-3-V1 | 3.50 |
| CCG-V-F | 16.00 |
| CCP-V-1 | 9.00 |
| CPTP-301 | 5.50 |
| CPTP-302 | 5.00 |
| CPTP-303 | 5.00 |
| CCZU-2-F | 4.00 |
| CCZU-3-F | 14.00 |
| Σ | 100.00 |

EXAMPLE 7

A STN display contains a liquid crystalline medium with the following properties:

| Clearing point/° C. | +90.0° C. |
|---|---|
| Δn (589 nm, 20° C.) | +0.1428 |
| ν (20° C.) [mm²s⁻¹] | 31 |
| HTP (20° C.)/μm⁻¹ | −11.95 |
| d · Δn (20° C.)/μm | 0.85 |
| Twist | 240° |
| $V_{10}$(20° C.)/V | 1.29 |
| $V_{90}/V_{10}$(20° C.) | 1.074 |
| consisting of | c/% |
| PCH-3N.F.F | 30.00 |
| ME2N.F | 2.20 |
| ME3N.F | 3.30 |
| ME4N.F | 5.00 |
| CC-3-V1 | 5.00 |
| CCP-V-1 | 13.00 |
| PPTUI-3-2 | 16.00 |
| CCZU-3-F | 13.00 |
| CBC-33F | 5.00 |
| CCPC-33 | 5.50 |
| CCPC-34 | 3.50 |
| Σ | 100.00 |

EXAMPLE 8

A STN display contains a liquid crystalline medium with the following properties:

| Clearing point/° C. | +75.0° C. |
|---|---|
| Δn (589 nm, 20° C.) | +0.1378 |
| ν (20° C.) [mm²s⁻¹] | 24 |
| HTP (20° C.)/μm⁻¹ | −12.32 |
| d · Δn (20° C.)/μm | 0.85 |
| Twist | 240° |
| $V_{10}$(20° C.)/V | 1.39 |
| $V_{90}/V_{10}$(20° C.) | 1.073 |
| consisting of | c/% |
| PCH-3N.F.F | 26.00 |
| ME2N.F | 2.00 |
| ME3N.F | 3.00 |
| PCH-301 | 7.00 |
| CCG-V-F | 16.00 |
| CCP-V-1 | 15.00 |
| CPTP-301 | 5.50 |
| PPTUI-3-2 | 13.00 |
| CCZU-2-F | 3.50 |
| CCZU-3-F | 9.00 |
| Σ | 100.00 |

EXAMPLE 9

A STN display contains a liquid crystalline medium with the following properties:

| | |
|---|---|
| Clearing point/° C. | +91.0° C. |
| Δn (589 nm, 20° C.) | +0.1269 |
| HTP (20° C.)/μm$^{-1}$ | −11.02 |
| d · Δn (20° C.)/μm | 0.85 |
| Twist | 240° |
| V$_{10}$(20° C.)/V | 1.18 |
| V$_{90}$/V$_{10}$(20° C.) | 1.088 |
| consisting of | c/% |
| ME2N.F | 7.00 |
| ME3N.F | 7.00 |
| ME4N.F | 14.00 |
| PCH-3N.F.F | 13.00 |
| CC-5-V | 8.00 |
| PYP-32 | 6.00 |
| CCP-V-1 | 10.50 |
| CPTP-301 | 5.00 |
| CP-33 | 3.00 |
| CP-35 | 3.00 |
| CCPC-33 | 4.50 |
| CCPC-34 | 4.50 |
| CCPC-35 | 4.50 |
| CCZU-3-F | 10.00 |
| Σ | 100.00 |

EXAMPLE 10

A STN display contains a liquid crystalline medium with the following properties:

| | |
|---|---|
| Clearing point/° C. | +89.0° C. |
| Δn (589 nm, 20° C.) | +0.1339 |
| ν (20° C.) [mm$^2$s$^{-1}$] | 37 |
| HTP (20° C.)/μm$^{-1}$ | −11.26 |
| d · Δn (20° C.)/μm | 0.85 |
| Twist | 240° |
| V$_{10}$(20° C.)/V | 1.32 |
| V$_{90}$/V$_{10}$(20° C.) | 1.087 |
| consisting of | c/% |
| PCH-3N.F.F | 21.00 |
| ME2N.F | 2.00 |
| ME3N.F | 3.00 |
| ME4N.F | 5.50 |
| K6 | 4.00 |
| K9 | 5.00 |
| PYP-32 | 5.00 |
| CC-3-V1 | 2.50 |
| CCP-V-1 | 4.50 |
| BCH-3F.F.F | 6.00 |
| CCZU-3-F | 12.50 |
| BCH-32 | 6.00 |
| CCPC-33 | 4.00 |
| CCPC-34 | 4.00 |
| CBC-33 | 5.00 |
| CBC-33F | 5.00 |
| CBC-53F | 5.00 |
| Σ | 100.00 |

EXAMPLE 11

A STN display contains a liquid crystalline medium with the following properties:

| | |
|---|---|
| Clearing point/° C. | +90.0° C. |
| Δn (589 nm, 20° C.) | +0.1331 |
| ν (20° C.) [mm$^2$s$^{-1}$] | 31 |
| HTP (20° C.)/μm$^{-1}$ | −11.32 |
| d · Δn (20° C.)/μm | 0.85 |
| Twist | 240° |
| V$_{10}$(20° C.)/V | 1.32 |
| V$_{90}$/V$_{10}$(20° C.) | 1.092 |
| consisting of | c/% |
| PCH-3N.F.F | 17.00 |
| ME2N.F | 2.50 |
| ME3N.F | 3.00 |
| ME4N.F | 9.50 |
| K6 | 5.00 |
| CC-5-V | 2.00 |
| CCP-V-1 | 15.00 |
| CCP-V2-1 | 5.00 |
| BCH-3F.F.F | 14.00 |
| CCZU-3-F | 7.50 |
| BCH-32 | 7.00 |
| CBC-33 | 3.50 |
| CBC-53 | 3.50 |
| CBC-33F | 5.50 |
| Σ | 100.00 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Supertwist liquid-crystal display comprising two plane-parallel outer plates which, together with a frame, form a cell, a liquid-crystal mixture of positive dielectric anisotropy which is present in the cell, electrode layers with superposed alignment layers on the insides of the outer plates which address each pixel by orthogonal row wave forms, pre-tilt angle between the longitudinal axis of the molecules at the surface of the outer plates and the outer plates of from about 1 degree to 30 degrees, and a twist angle of the liquid-crystal mixture in the cell from alignment layer to alignment layer with a value of between 22.5 and 600°, wherein the liquid-crystal mixture comprises a) 30–90% by weight of a liquid-crystalline component A, comprising one or more compounds having a dielectric anisotropy of more than +1.5;

b) 10–45% by weight of a liquid-crystalline component B, comprising one or more compounds having a dielectric anisotropy from −1.5 to +1.5;

c) 0–10% by weight of a liquid-crystalline component D, comprising one or more compounds having a dielectric anisotropy of less than −1.5, and d) an optically active component C in such an amount that the ratio between the layer thickness (separation of the plane-parallel outer plates) and the natural pitch of the liquid-crystal mixture is from about 0.2 to 1.3, characterized in that the liquid crystal mixture comprises at least one compound of component A having a 3,4,5-trifluorophenyl group and at least one compound of formula I

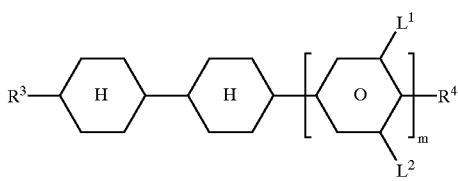
I wherein
R³ is an alkenyl group with 2 to 7 C atoms,
R⁴ is an optionally fluorinated alkyl, alkoxy, alkenyl or alkenyloxy group with 1 to 12 C atoms, wherein one or two non-adjacent CH₂ groups can be replaced by —O—, —CH=CH—, —CO—, —OCO— or —COO— in such a manner that O atoms are not directly adjacent to one another, or, in case m=1, R⁴ can also be Q—Y,
Q is CF₂, OCF₂, CFH, OCHF or a single bond,
Y is F is Cl,
L¹ and L² are each independently H or F, and
m is 0 or 1.

2. Display according to claim 1, characterized in that the compounds having a 3,4,5-trifluorophenyl group are selected of formula II

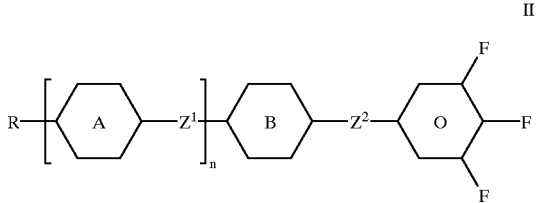
II wherein
R is an optionally fluorinated alkyl, alkoxy, alkenyl or alkenyloxy group with 1 to 12 C atoms, wherein one or two non-adjacent CH₂ groups can be replaced by —O—, —CH=CH—, —CO—, —OCO— or —COO— in such a manner that O atoms are not directly adjacent to one another,

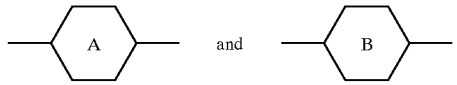

and are each independently

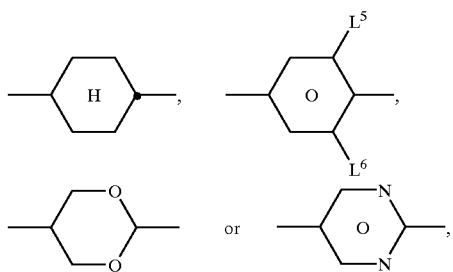

L⁵ and L⁶ are each independently H or F,
Z¹ and Z² are independently of each other —COO—, —CH₂CH₂—, —CH=CH—, —C≡C— or a single bond, and
n is 0, 1 or 2.

3. Display according to claim 2, characterized in that the compounds of formula II are selected from the following formulae

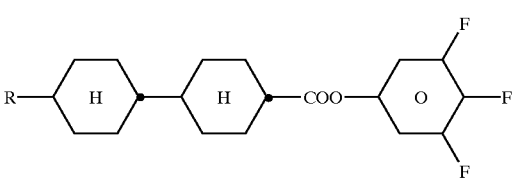
IIa

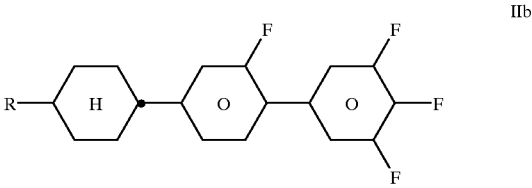
IIb

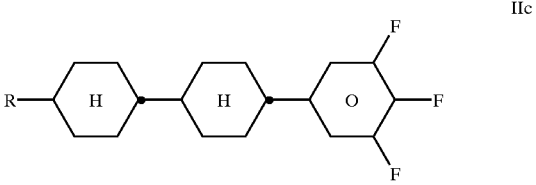
IIc

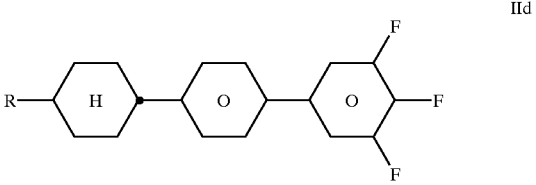
IId

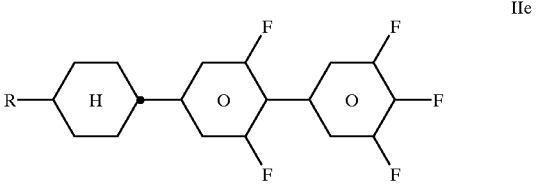
IIe

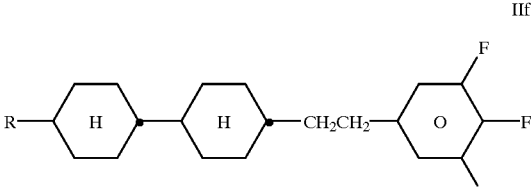
IIf

IIg

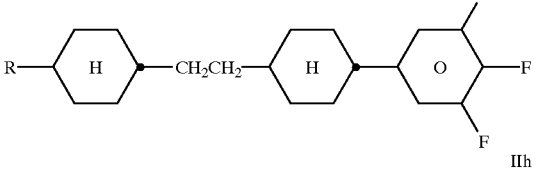
IIh wherein R is as defined in formula II.

4. Display according to claim 1, characterized in that component a further comprises one or more compounds of formula III

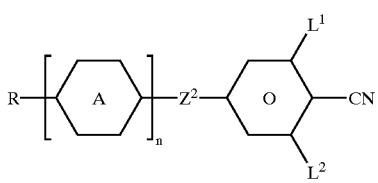

wherein

R is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another,

is independently

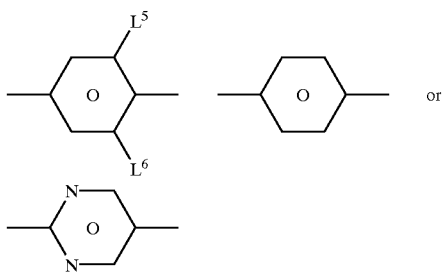

$Z^2$ is —COO—, —$CH_2CH_2$—, —CH=CH—, —C≡C— or a single bond, n is 0, 1 or 2, and $L^1$ and $L^2$ are each independently H or F.

5. Display according to claim 4, characterized in that the compounds of formula III are selected from the following formulae

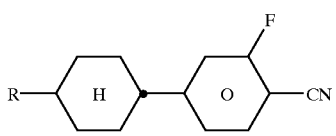

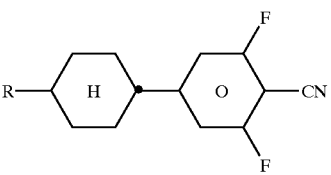

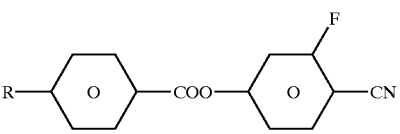

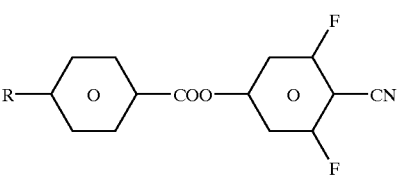

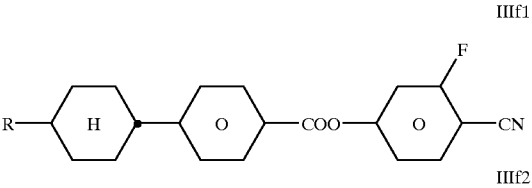

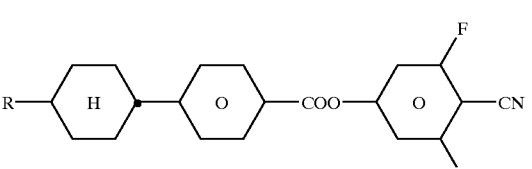

wherein R is as defined in formula III.

6. A supertwist liquid-crystal display comprising:
two plane-parallel outer plates which, together with a frame, form a cell,
a liquid-crystal mixture of positive dielectric anisotropy which is present in the cell,
electrode layers with superposed alignment layers on the insides of the outer plates which address each pixel by orthogonal row wave forms,
pre-tilt angle between the longitudinal axis of the molecules at the surface of the outer plates and the outer plates of from about 1 degree to 30 degrees, and
a twist angle of the liquid-crystal mixture in the cell from alignment layer to alignment layer with a value of between 22.5 and 600°, wherein the liquid-crystal mixture comprises
a) 30–90% by weight of a liquid-crystalline component A, comprising one or more compounds having a dielectric anisotropy of more than +1.5;
b) 10–45% by weight of a liquid-crystalline component B, comprising one or more compounds having a dielectric anisotropy from −1.5 to +1.5;
c) 0–10% by weight of a liquid-crystalline component D, comprising one or more compounds having a dielectric anisotropy of less than −1.5, and
d) an optically active component C in such an amount that the ratio between the layer thickness (separation of the plane-parallel outer plates) and the natural pitch of the liquid-crystal mixture is from about 0.2 to 1.3, wherein the liquid crystal mixture comprises at least one compound of component A having a 3,4,5-trifluorophenyl group and at least one compound of formula I

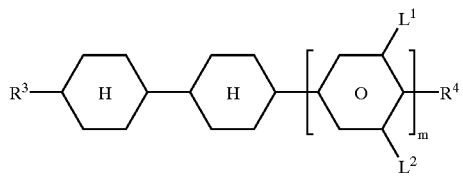

wherein
$R^3$ is an alkenyl group with 2 to 7 C atoms,
$R^4$ is an optionally fluorinated alkyl, alkoxy, alkenyl or alkenyloxy group with 1 to 12 C atoms, wherein one or tow non-adjacent $CH_2$ groups can be replaced by —O—, —CH=CH—, —CO—, —OCO— or —COO— in such a manner that O atoms are not directly adjacent to one another, or, in case m=1, $R^4$ can also be Q—Y,
Q is $CF_2$, $OCF_2$, CFH, OCHF or a single bond,
Y is F is Cl,
$L^1$ and $L^2$ are each independently H or F, and
m is 0 or 1.
wherein the liquid crystal mixture further comprises one or more compounds of formula V

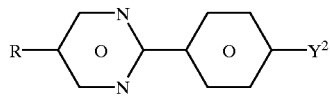

R is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, and
$Y^2$ is F or Cl.

7. Display according to claim 1, characterized in that the liquid crystal mixture comprises 11 to 44% by weight of one or more compounds having a 3,4,5-trifluorophenyl group.

8. A supertwist liquid-crystal display comprising:
two plane-parallel outer plates which, together with a frame, form a cell,
a liquid-crystal mixture of positive dielectric anisotropy which is present in the cell,
electrode layers with superposed alignment layers on the insides of the outer plates which address each pixel by orthogonal row wave forms,
pre-tilt angle between the longitudinal axis of the molecules at the surface of the outer plates and the outer plates of from about 1 degree to 30 degrees, and
a twist angle of the liquid-crystal mixture in the cell from alignment layer to alignment layer with a value of between 22.5 and 600°, wherein the liquid-crystal mixture comprises
a) 30–90% by weight of a liquid-crystalline component A, comprising one or more compounds having a dielectric anisotropy of more than +1.5;
b) 10–45% by weight of a liquid-crystalline component B, comprising one or more compounds having a dielectric anisotropy from −1.5 to +1.5;
c) 0–10% by weight of a liquid-crystalline component D, comprising one or more compounds having a dielectric anisotropy of less than −1.5, and
d) an optically active component C in such an amount that the ratio between the layer thickness (separation of the plane-parallel outer plates) and the natural pitch of the liquid-crystal mixture is from about 0.2 to 1.3,
wherein the liquid crystal mixture comprises at least one compound of component A having a 3,4,5-trifluorophenyl group and at least one compound of formula I

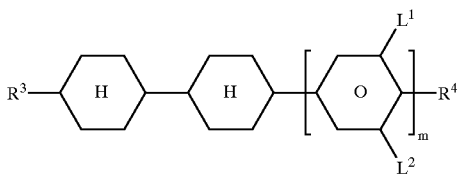

wherein
$R^3$ is an alkenyl group with 2 to 7 C atoms,
$R^4$ is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, or, in case m=1, $R^4$ can also be Q—Y,
Q is $CF_2$, $OCF_2$, CFH, OCHF or a single bond,
Y is F or Cl,
$L^1$ and $L^2$ are each independently H or F, and
m is 0 or 1;
wherein the liquid crystal mixture comprises more than 58% by weight of one or more compounds having a positive dielectric anisotropy of more than +12.

9. A supertwist liquid-crystal display comprising:
two plane-parallel outer plates which, together with a frame, form a cell,
a liquid-crystal mixture of positive dielectric anisotropy which is present in the cell,
electrode layers with superposed alignment layers on the insides of the outer plates which address each pixel by orthogonal row wave forms,
pre-tilt angle between the longitudinal axis of the molecules at the surface of the outer plates and the outer plates of from about 1 degree to 30 degrees, and
a twist angle of the liquid-crystal mixture in the cell from alignment layer to alignment layer with a value of between 22.5 and 600°, wherein the display has a threshold voltage of 1.5 V or less;
wherein the liquid-crystal mixture comprises
a) 30–90% by weight of a liquid-crystalline component A, comprising one or more compounds having a dielectric anisotropy of more than +1.5;
b) 10–45% by weight of a liquid-crystalline component B, comprising one or more compounds having a dielectric anisotropy from −1.5 to +1.5;
c) 0–10% by weight of a liquid-crystalline component D, comprising one or more compounds having a dielectric anisotropy of less than −1.5, and
d) an optically active component C in such an amount that the ratio between the layer thickness (separation of the plane-parallel outer plates) and the natural pitch of the liquid-crystal mixture is from about 0.2 to 1.3, wherein the liquid crystal mixture comprises at least one compound of component A having a 3,4,5-trifluorophenyl group and at least one compound of formula I

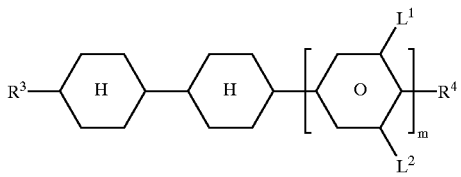

wherein $R^3$ is an alkenyl group with 2 to 7 C atoms, $R^4$ is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, or, in case m=1, $R^4$ can also be Q—Y, Q is $CF_2$, $OCF_2$, CFH, OCHF or a single bond, Y is F or Cl, $L^1$ and $L^2$ are each independently H or F, and m is 0 or 1.

10. Liquid crystal mixture or composition, comprising:

a) 30–90% by weight of a liquid-crystalline component A, comprising one or more compounds having a dielectric anisotropy of more than +1.5;

b) 10–45% by weight of a liquid-crystalline component B, comprising one or more compounds having a dielectric anisotropy from –1.5 to +1.5;

c) 0–10% by weight of a liquid-crystalline component D, comprising one or more compounds having a dielectric anisotropy of less than –1.5, and d) an optically active component C in such an amount that the ratio between the layer thickness (separation of the plane-parallel outer plates) and the natural pitch of the liquid-crystal mixture is from about 0.2 to 1.3, wherein the liquid crystal mixture comprises at least one compound of component A having a 3,4,5-trifluorophenyl group and at least one compound of formula I

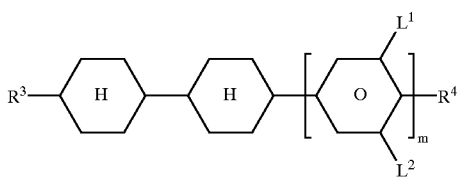

wherein $R^3$ is an alkenyl group with 2 to 7 C atoms, $R^4$ is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, or, in case m=1, $R^4$ can also be Q—Y, Q is $CF_2$, $OCF_2$, CFH, OCHF or a single bond, Y is F or Cl, $L^1$ and $L^2$ are each independently H or F, and m is 0 or 1.

11. Display according to claim 6, wherein the compounds having a 3,4,5-trifluorophenyl group are of formula II

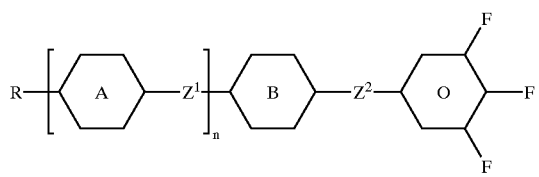

wherein

R is an optionally fluorinated alkyl, alkoxy, alkenyl or alkenyloxy group with 1 to 12 C atoms, wherein on or two non-adjacent $CH_2$ groups can be replaced by —O—, —CH=CH—, —CO—, —OCO— or —COO— in such a manner that O atoms are not directly adjacent to one another,

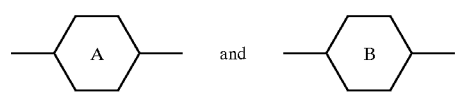

are each independently

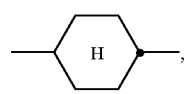

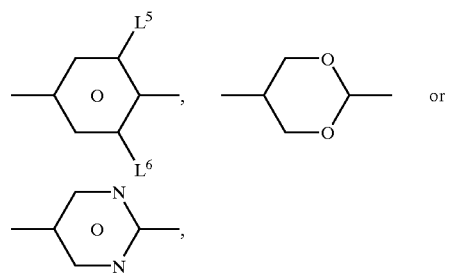

$L^5$ or $L^6$ are each independently H or F, $Z^1$ and $Z^2$ are independently of each other —COO—, —$CH_2CH_2$—, —CH=CH—, —C≡C— or a n is 0, 1 or 2.

12. Display according to claim 11, wherein the compound of formula II is:

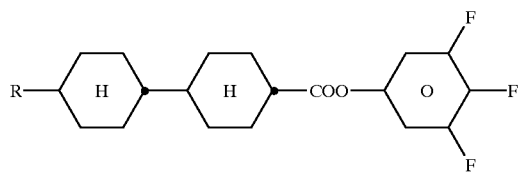

-continued

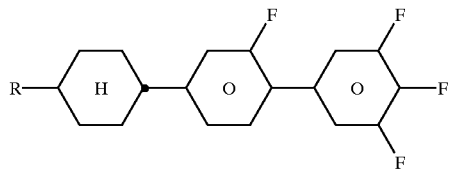
IIb

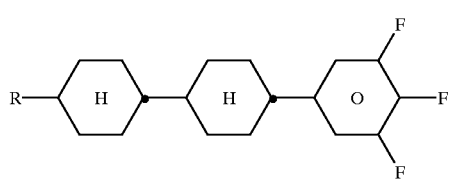
IIc

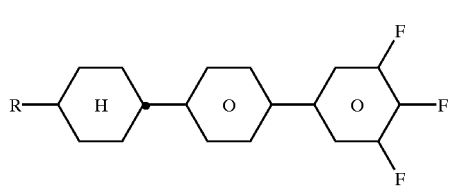
IId

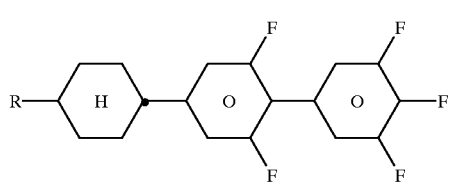
IIe

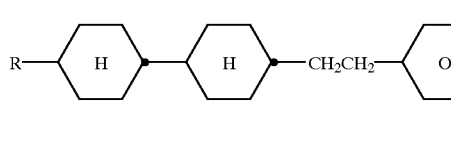
IIf

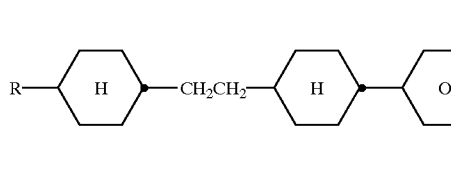
IIg

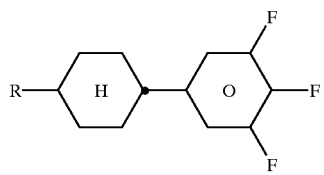
IIh wherein R is as defined in formula II.

13. Display according to claim 6, wherein component A further comprises one or more compounds of formula III

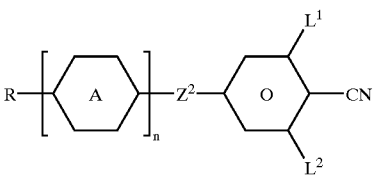
III wherein

R is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another,

is indepenently

,

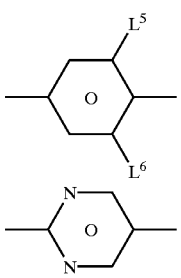

$Z^2$ is —COO—, —$CH_2CH_2$—, —CH=CH—, —C≡C— or a single bond, n is 0, 1 or 2, and $L^1$ and $L^2$ are each independently H or F.

14. Display according to claim 4, wherein the compound of formula III is:

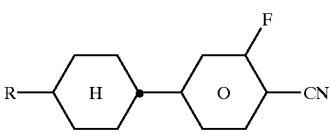
IIIb1

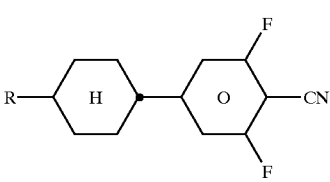
IIIb2

-continued

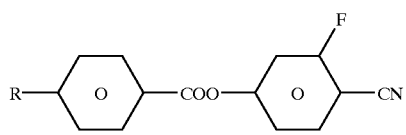
IIIc1

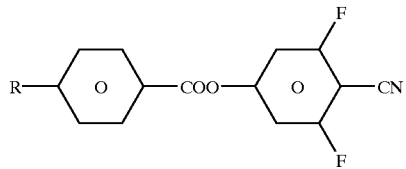
IIIc2

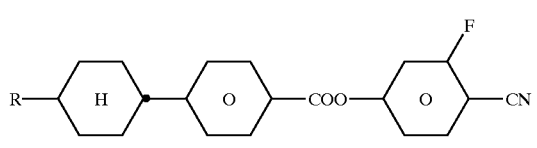
IIIf1
or

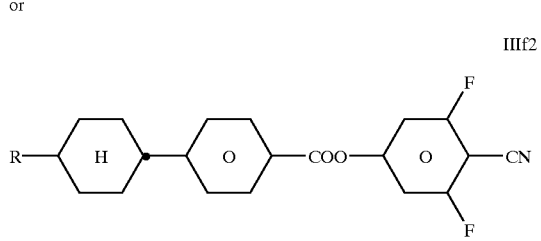
IIIf2 wherein R is as defined in formula III.

15. Liquid crystal mixture or composition, comprising:
a) 30–90% by weight of a liquid-crystalline component A, comprising one or more compounds having a dielectric anisotropy of more than +1.5;
b) 10–45% by weight of a liquid-crystalline component B, comprising one or more compounds having a dielectric anisotropy from −1.5 to +1.5;
c) 0–10% by weight of a liquid-crystalline component D, comprising one or more compounds having a dielectric anisotropy of less than −1.5, and
d) an optically active component C in such an amount that the ratio between the layer thickness (separation of the plane-parallel outer plates) and the natural pitch of the chiral nematic liquid-crystal mixture is from about 0.2 to 1.3, wherein the liquid crystal mixture comprises at least one compound of component A having a 3,4,5-trifluorophenyl group and at least one compound of formula I

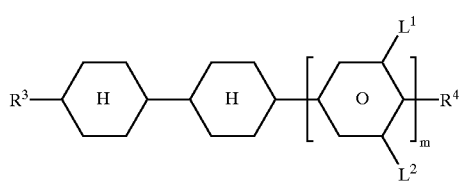
I wherein
$R^3$ is an alkenyl group with 2 to 7 C atoms,
$R^4$ is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, or, in case m=1, $R^4$ can also be Q—Y,
Q is $CF_2$, $OCF_2$, CFH, OCHF or a single bond,
Y is F or Cl,
$L^1$ and $L^2$ are each independently H or F, and
m is 0 or 1;

wherein the liquid crystal mixture further comprises one or more compounds of formula V

R—⟨O⟩—⟨N=N⟩—⟨O⟩—$Y^2$  V

R is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, and
$Y^2$ is F or Cl.

16. Display according to claim 8, wherein the liquid crystal mixture further comprises one or more compounds of formula V

R—⟨O⟩—⟨N=N⟩—⟨O⟩—$Y^2$  V

R is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, and
$Y^2$ is F or Cl.

17. Display according to claim 9, wherein the liquid crystal mixture further comprises one or more compounds of formula V

R—⟨O⟩—⟨N=N⟩—⟨O⟩—$Y^2$  V

R is an optionally fluorinated alkyl, alkoxy, alkenyl or alkenyloxy group with 1 to 12 C atoms, wherein one or two non-adjacent $CH_2$ groups can be replaced by —O—, —CH=CH—, —CO—, —OCO— or —COO— in such a manner that O atoms are not directly adjacent to one another, and
$Y^2$ is F or Cl.

18. Display according to claim 6, wherein the liquid crystal mixture comprises more than 58% by weight of one or more compounds having a positive dielectric anisotropy of more than +12.

19. Display according to claim 9, wherein the liquid crystal mixture comprises more than 58% by weight of one or more compounds having a positive dielectric anisotropy of more than +12.

20. Display according to claim 6, wherein the display has a threshold voltage of 1.5 V or less.

21. Display according to claim 8, wherein the display has a threshold voltage of 1.5 V or less.

22. Display according to claim 1, wherein the compounds having a 3,4,5-trifluorophenyl group are selected of formula II $$R-\left[\underset{A}{\bigcirc}-Z^1\right]_n \underset{B}{\bigcirc}-Z^2-\underset{O}{\bigcirc}\begin{matrix}F\\F\\F\end{matrix}\qquad \text{II}$$

wherein
- R is an optionally fluorinated alkyl, alkoxy, alkenyl or alkenyloxy group with 1 to 12 C atoms, wherein one or two non-adjacent CH$_2$ groups can be replaced by —O—, —CH=CH—, —CO—, —OCO— or —COO— in such a manner that O atoms are not directly adjacent to one another, $$-\underset{A}{\bigcirc}- \quad \text{and} \quad -\underset{B}{\bigcirc}-$$

are each independently $$-\underset{H}{\bigcirc}-,$$

$$-\underset{O}{\overset{L^5}{\underset{L^6}{\bigcirc}}}-, \quad -\underset{O}{\overset{O}{\bigcirc}}- \quad \text{or}$$

$$-\underset{N}{\overset{N}{\bigcirc}}-,$$

L$^5$ and L$^6$ are each independently H or F,
Z$^1$ independently of Z$^2$ is —COO—, —CH$_2$CH$_2$—, —CH=CH—, —C≡C— or a single bond, and Z$^2$ is —COO—; and
n is 0, 1 or 2.

23. Display according to claim 6, wherein the compounds having a 3,4,5-trifluorophenyl group are of formula II $$R-\left[\underset{A}{\bigcirc}-Z^1\right]_n \underset{B}{\bigcirc}-Z^2-\underset{O}{\bigcirc}\begin{matrix}F\\F\\F\end{matrix}\qquad \text{II}$$

wherein
- R is an optionally fluorinated alkyl, alkoxy, alkenyl or alkenyloxy group with 1 to 12 C atoms, wherein one or two non-adjacent CH$_2$ groups can be replaced by —O—, —CH=CH—, —CO—, —OCO— or —COO— in such a manner that O atoms are not directly adjacent to one another, $$-\underset{A}{\bigcirc}- \quad \text{and} \quad -\underset{B}{\bigcirc}-$$

are each independently $$-\underset{H}{\bigcirc}-,$$

$$-\underset{O}{\overset{L^5}{\underset{L^6}{\bigcirc}}}-, \quad -\underset{O}{\overset{O}{\bigcirc}}- \quad \text{or}$$

$$-\underset{N}{\overset{N}{\bigcirc}}-,$$

L$^5$ and L$^6$ are each independently H or F,
Z$^1$ independently of Z$^2$ is —COO—, —CH$_2$CH$_2$—, —CH=CH—, —C≡C— or a single bond, and Z$^2$ is —COO—; and
n is 0, 1 or 2.

24. Display according to claim 8, wherein the compounds having a 3,4,5-trifluorophenyl group are of formula II $$R-\left[\underset{A}{\bigcirc}-Z^1\right]_n \underset{B}{\bigcirc}-Z^2-\underset{O}{\bigcirc}\begin{matrix}F\\F\\F\end{matrix}\qquad \text{II}$$

wherein
- R is an optionally fluorinated alkyl, alkoxy, alkenyl or alkenyloxy group with 1 to 12 C atoms, wherein one or two non-adjacent CH$_2$ groups can be replaced by —O—, —CH=CH—, —CO—, —OCO— or —COO— in such a manner that O atoms are not directly adjacent to one another, $$-\underset{A}{\bigcirc}- \quad \text{and} \quad -\underset{B}{\bigcirc}-$$

are each independently $$-\underset{H}{\bigcirc}-,$$

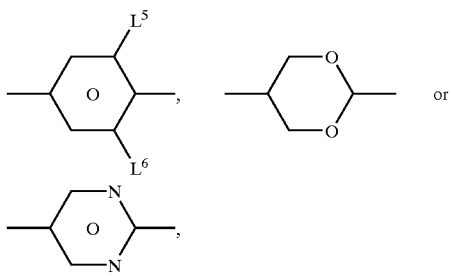

$L^5$ and $L^6$ are each independently H or F, $Z^1$ independently of $Z^2$ is —COO—, —CH$_2$CH$_2$—, —CH=CH—, —C≡C— or a single bond, and $Z^2$ is —COO—; and n is 0, 1 or 2.

25. Display according to claim 9, wherein the compounds having a 3,4,5-trifluorophenyl group are of formula II

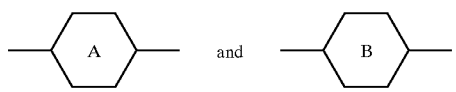

wherein

R is an optionally fluorinated alkyl, alkoxy, alkenyl or alkenyloxy group with 1 to 12 C atoms, wherein one or two non-adjacent CH$_2$ groups can be replaced by —O—, —CH=CH—, —CO—, —OCO— or —COO— in such a manner that O atoms are not directly adjacent to one another,

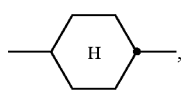 and 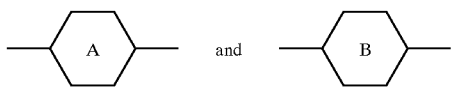

are each independently

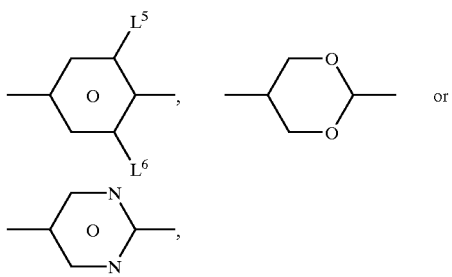

$L^5$ and $L^6$ are each independently H or F, $Z^1$ independently of $Z^2$ is —COO—, —CH$_2$CH$_2$—, —CH=CH—, —C≡C— or a single bond, and $Z^2$ is —COO—; and n is 0, 1 or 2.

26. Display according to claim 1, wherein the compounds having a 3,4,5-trifluorophenyl group are of formula II

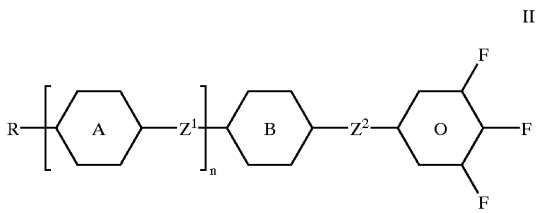

wherein

R is an optionally fluorinated alkyl, alkoxy, alkenyl or alkenyloxy group with 1 to 12 C atoms, wherein one or two non-adjacent CH$_2$ groups can be replaced by —O—, —CH=CH—, —CO—, —OCO— or —COO— in such a manner that O atoms are not directly adjacent to one another

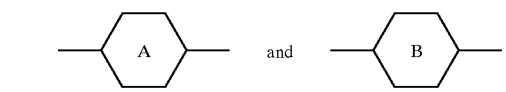

are each independently

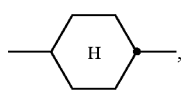

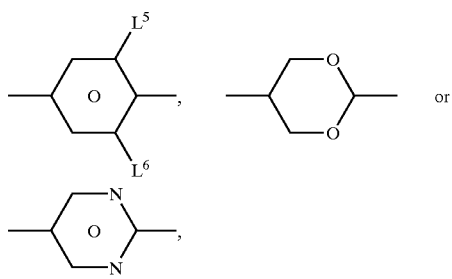

$L^5$ and $L^6$ are each independently H or F, $Z^2$ independently of $Z^1$ is —COO—, —CH$_2$CH$_2$—, —CH=CH—, —C≡C— or a single bond, and $Z^1$ is a single bond; and n is 0, 1 or 2.

27. Display according to claim 6, wherein the compounds having a 3,4,5-trifluorophenyl group are of formula II

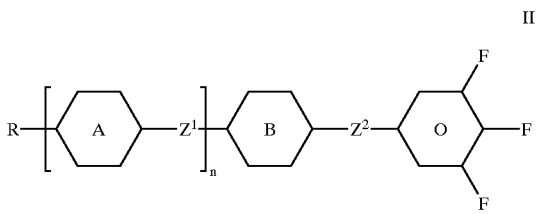

wherein

R is an optionally fluorinated alkyl, alkoxy, alkenyl or alkenyloxy group with 1 to 12 C atoms, wherein one or two non-adjacent CH$_2$ groups can be replaced by —O—, —CH=CH—, —CO—, —OCO— or —COO— in such a manner that O atoms are not directly adjacent to one another,

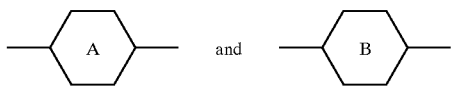

are each independently

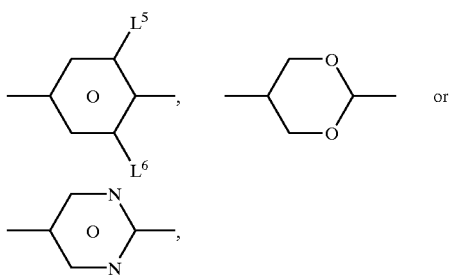

$L^5$ and $L^6$ are each independently H or F, $Z^2$ independently of $Z^1$ is —COO—, —CH$_2$CH$_2$—, —CH=CH—, —C≡C— or a single bond, and $Z^1$ is a single bond; and n is 0, 1 or 2.

28. Display according to claim 8, wherein the compounds having a 3,4,5-trifluorophenyl group are of formula II

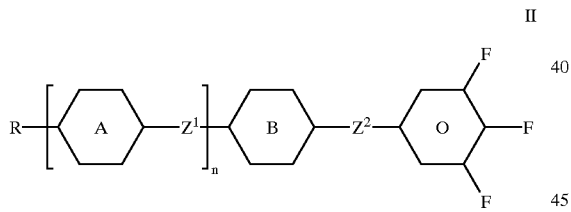

II wherein

R is an optionally fluorinated alkyl, alkoxy, alkenyl or alkenyloxy group with 1 to 12 C atoms, wherein one or two non-adjacent CH$_2$ groups can be replaced by —O—, —CH=CH—, —CO—, —OCO— or —COO— in such a manner that O atoms are not directly adjacent to one another,

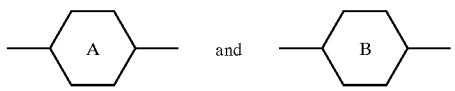

are each independently

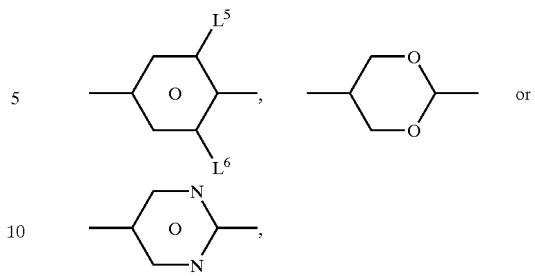

$L^5$ and $L^6$ are each independently H or F, $Z^2$ independently of $Z^1$ is —COO—, —CH$_2$CH$_2$—, —CH=CH—, —C≡C— or a single bond, and $Z^1$ is a single bond; and n is 0,1 or 2.

29. Display according to claim 9, wherein the compounds having a 3,4,5-trifluorophenyl group are of formula II

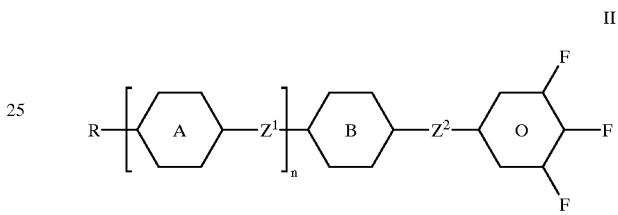

II wherein

R is an optionally fluorinated alkyl, alkoxy, alkenyl or alkenyloxy group with 1 to 12 C atoms, wherein one or two non-adjacent CH$_2$ groups can be replaced by —O—, —CH=CH—, —CO—, —OCO— or —COO— in such a manner that O atoms are not directly adjacent to one another,

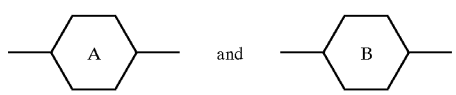

are each independently

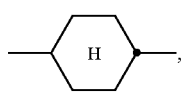

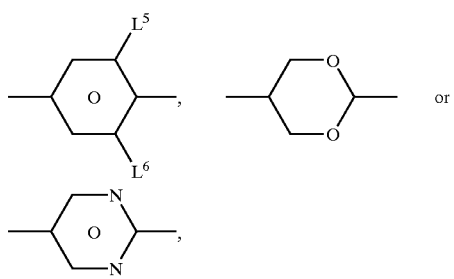

$L^5$ and $L^6$ are each independently H or F, $Z^2$ independently of $Z^1$ is —COO—, —CH$_2$CH$_2$—, —CH=CH—, —C≡C— or a single bond, and $Z^1$ is a single bond; and n is 0, 1 or 2.

30. Display according to claim 1, wherein the compounds having a 3,4,5-trifluorophenyl group are selected from

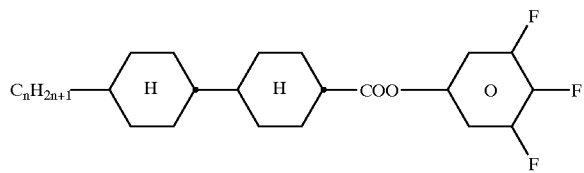

where n is an integer from 1–12.

31. Display according to claim 1, wherein the compounds having a 3,4,5-trifluorophenyl group are selected from

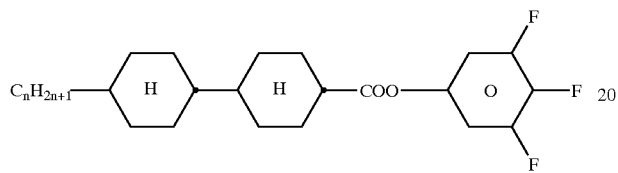

where n is an integer of 2, 3 or 5.

32. Display according to claim 6, wherein the compounds having a 3,4,5-trifluorophenyl group are selected from

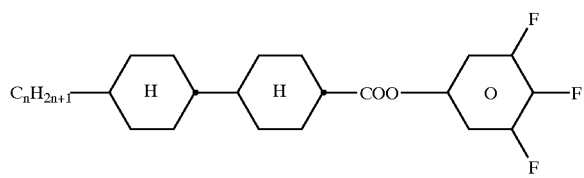

where n is an integer from 1–12.

33. Display according to claim 6, wherein the compounds having a 3,4,5-trifluorophenyl group are selected from

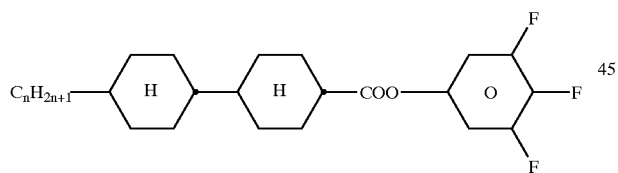

where n is an integer from 2, 3, or 5.

34. Display according to claim 8, wherein the compounds having a 3,4,5-trifluorophenyl group are selected from

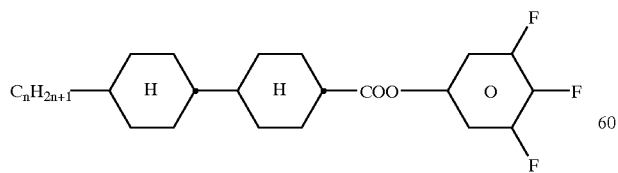

where n is an integer from 1–12.

35. Display according to claim 8, wherein the compounds having a 3,4,5-trifluorophenyl group are selected from

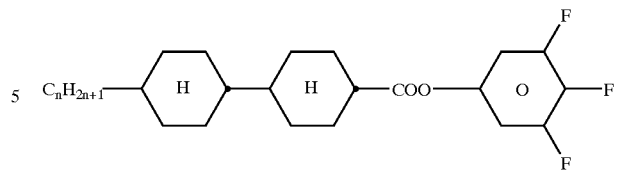

where n is an integer of 2, 3, or 5.

36. Display according to claim 9, wherein the compounds having a 3,4,5-trifluorophenyl group are selected from

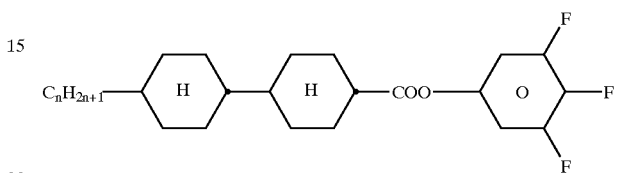

where n is an integer from 1–12.

37. Display according to claim 9, wherein the compounds having a 3,4,5-trifluorophenyl group are selected from

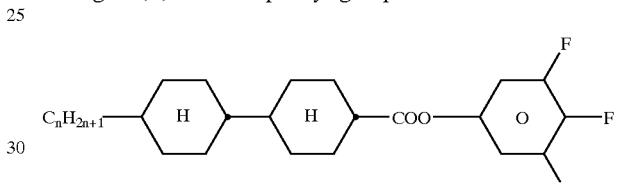

where n is an integer of 2, 3 or 5.

38. Display according to claim 1, wherein the liquid-crystal mixture is nematic.

39. Display according to claim 1, wherein the liquid-crystal mixture is chiral.

40. Liquid crystal mixture or composition, comprising:
   a) 30–90% by weight of a liquid-crystalline component A, comprising one or more compounds having a dielectric anisotropy of more than +1.5;
   b) 10–45% by weight of a liquid-crystalline component B, comprising one or more compounds having a dielectric anisotropy from −1.5 to +1.5;
   c) 0–10% by weight of a liquid-crystalline component D, comprising one or more compounds having a dielectric anisotropy of less than −1.5, and
   d) an optically active component C in such an amount that the ratio between the layer thickness (separation of the plane-parallel outer plates) and the natural pitch of the liquid-crystal mixture is from about 0.2 to 1.3, wherein the liquid crystal mixture comprises at least one compound of component A having a 3,4,5-trifluorophenyl group and at least one compound of formula I

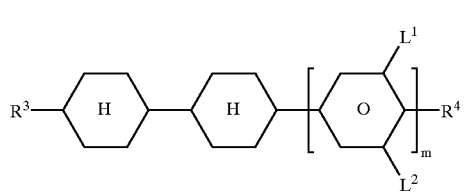

wherein

R³ is an alkenyl group with 2 to 7 C atoms,

R⁴ is an optionally fluorinated alkyl, alkoxy, alkenyl or alkenyloxy group with 1 to 12 C atoms, wherein one or two non-adjacent CH₂ groups can be replaced by —O—, —CH=CH—, —CO—, —OCO— or —COO— in such a manner that O atoms are not directly adjacent to one another, or, in case m=1, R⁴ can also be Q—Y, Q is $CF_2$, $OCF_2$, CFH, OCHF or a single bond, Y is F or Cl, $L^1$ and $L^2$ are each independently H or F, and m is 0 or 1;

wherein the liquid crystal mixture comprises more than 58% by weight of one or more compounds having a positive dielectric anisotropy of more than +12.

41. Liquid crystal mixture or composition for a display having a threshold voltage of 1.5V or less comprising:

a) 30–90% by weight of a liquid-crystalline component A, comprising one or more compounds having a dielectric anisotropy of more than +1.5;

b) 10–45% by weight of a liquid-crystalline component B, comprising one or more compounds having a dielectric anisotropy from −1.5 to +1.5;

c) 0–10% by weight of a liquid-crystalline component D, comprising one or more compounds having a dielectric anisotropy of less than −1.5, and d) an optically active component C in such an amount that the ratio between the layer thickness (separation of the plane-parallel outer plates) and the natural pitch of the liquid-crystal mixture is from about 0.2 to 1.3, wherein the liquid crystal mixture comprises at least one compound of component A having a 3,4,5-trifluorophenyl group and at least one compound of formula I

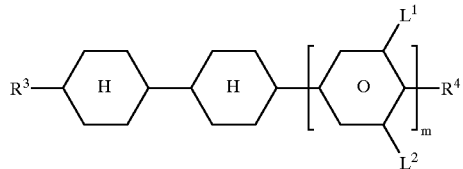

wherein

R³ is an alkenyl group with 2 to 7 C atoms,

R⁴ is an optionally fluorinated alkyl, alkoxy, alkenyl or alkenyloxy group with 1 to 12 C atoms, wherein one or two non-adjacent CH₂ groups can be replaced by —O—, —CH=CH—, —CO—, —OCO— or —COO— such a manner that O atoms are not directly adjacent to one another, or, in case m=1, R⁴ can also be Q—Y, Q is $CF_2$, $OCF_2$, CFH, OCHF, or a single bond, Y is F or Cl, $L^1$ or $L^2$ are each independently H or F, and m is 0 or 1.

* * * * *

UNITED STATES PATENT AND TRADEMARK OFFICE
CERTIFICATE OF CORRECTION

PATENT NO.   : 6,440,506 B1                                          Page 1 of 1
DATED        : August 27, 2002
INVENTOR(S)  : Kojima et al.

It is certified that error appears in the above-identified patent and that said Letters Patent is hereby corrected as shown below:

Column 7,
Line 45, delete the following structure:
"                                                                    "  IIId

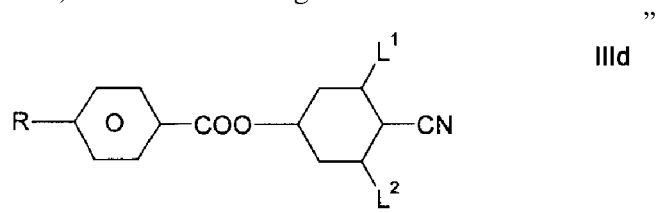

Line 45, add the following structure:

--                                                                   IIId --

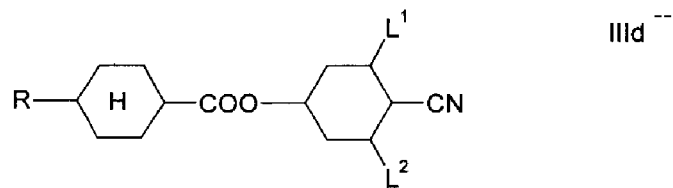

Signed and Sealed this

Twenty-second Day of March, 2005

JON W. DUDAS
*Director of the United States Patent and Trademark Office*